US008127168B2

(12) United States Patent  (10) Patent No.: US 8,127,168 B2
Maeda et al.  (45) Date of Patent: Feb. 28, 2012

(54) DATA PROCESSING DEVICE FOR REDUCING POWER CONSUMPTION WHILE OPERATING A VIRTUALIZED ENVIRONMENT, AND A NON-TRANSITORY COMPUTER-READABLE RECORDING MEDIUM AND INTEGRATED CIRCUIT FOR PERFORMING THE SAME

(75) Inventors: Manabu Maeda, Osaka (JP); Tomoyuki Haga, Nara (JP); Takayuki Ito, Osaka (JP); Hideki Matsushima, Osaka (JP); Yuichi Futa, Osaka (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 12/377,320

(22) PCT Filed: Jun. 4, 2008

(86) PCT No.: PCT/JP2008/001418
§ 371 (c)(1),
(2), (4) Date: Mar. 10, 2009

(87) PCT Pub. No.: WO2009/004757
PCT Pub. Date: Jan. 8, 2009

(65) Prior Publication Data
US 2010/0229168 A1 Sep. 9, 2010

(30) Foreign Application Priority Data

Jul. 5, 2007 (JP) ................................. 2007-177075

(51) Int. Cl.
*G06F 1/00* (2006.01)
(52) U.S. Cl. .......................... 713/330; 713/300; 713/502
(58) Field of Classification Search ................... 713/320
See application file for complete search history.

(56) References Cited

U.S. PATENT DOCUMENTS

| 5,408,617 | A | 4/1995 | Yoshida |
| 7,120,911 | B1 | 10/2006 | Katayama |
| 7,127,723 | B2 | 10/2006 | Endo et al. |
| 7,543,166 | B2* | 6/2009 | Zimmer et al. ................ 713/310 |
| 7,739,532 | B2* | 6/2010 | Grobman ...................... 713/322 |
| 2007/0028132 | A1 | 2/2007 | Wang |
| 2007/0055860 | A1 | 3/2007 | Wang |

FOREIGN PATENT DOCUMENTS

| JP | 4-314137 | 11/1992 |
| JP | 2000-347772 | 12/2000 |
| JP | 2001-243080 | 9/2001 |
| JP | 2001-256067 | 9/2001 |
| JP | 2007-35015 | 2/2007 |

(Continued)

OTHER PUBLICATIONS

Tian et al; "How virtualization makes power management different"; Proceedings of the Linux Symposium; vol. 1; Jun. 27-30, 2007; pp. 205-214.*

(Continued)

*Primary Examiner* — Ryan Stiglic
(74) *Attorney, Agent, or Firm* — Wenderoth, Lind & Ponack, L.L.P.

(57) ABSTRACT

A data processing device including an inter-VM notification management unit 1242, a resuming judgment unit 1244 and a scheduled interruption time acquisition unit 1245, such that, when it is necessary to notify a virtual machine in a power-saving state, the resuming judgment unit 1244 judges whether to cause the virtual machine to return from the power saving state, based on a time until an interruption acquired by the scheduled interruption time acquisition unit 1245. This structure prevents unnecessary transitions between states, and realizes the power saving for the apparatus.

12 Claims, 27 Drawing Sheets

T0: TIME OF ENTERING INTO THE POWER-SAVING STATE
T1: REFERENCE TIME
T2: TIMER SETTING TIME
T3: SCHEDULED PLAYBACK STOP TIME
t1: EVENT EXECUTION PERIOD
t2: RECOVERY PERIOD

FOREIGN PATENT DOCUMENTS

JP            2007-73026       3/2007

OTHER PUBLICATIONS

Yoo et al; "A virtual machine monitor for mobile phones"; In Proceedings of the First Workshop on Virtualization in Mobile Computing (MobiVirt '08); ACM; pp. 1-5.*

International Search Report issued Aug. 26, 2008 in the International (PCT) Application of which the present application is the U.S. National Stage.

"Virtualization Systems from Engineers' Perspective," *UNIX Magazine*, Winter 2007, ASCII Media Works Inc., Dec. 2006, pp. 38-45.

* cited by examiner

FIG. 6

| MANAGEMENT INFORMATION | | |
|---|---|---|
| AREA IDENTIFIER 1 | | |
| AREA INFORMATION 1: ADDRESS xx111100~xx25000 | | |
| OS IDENTIFIER 1: RTOS | | OS IDENTIFIER 2: GENERAL-PURPOSE OS |
| APPLICATION IDENTIFIER 1: DRM APPLICATION | | APPLICATION IDENTIFIER 2: PLAYBACK APPLICATION |
| NOTIFICATION TIMING INFORMATION 1: A | | NOTIFICATION TIMING INFORMATION 2: C |

FIG. 7

JUDGMENT CRITERION TABLE 1270

| IDENTIFIER | JUDGMENT CRITERION INFORMATION | | JUDGMENT RESULT |
|---|---|---|---|
| | NOTIFICATION TIMING INFORMATION | TIME CRITERION | |
| A | TO BE NOTIFIED IMMEDIATELY | — | RECOVER IMMEDIATELY (1271) |
| B | TO BE NOTIFIED WITHIN A PRESCRIBED PERIOD | CURRENT TIME ≧ REFERENCE TIME | RECOVER IMMEDIATELY (1272) |
| | | CURRENT TIME < REFERENCE TIME | NOT RECOVER |
| C | TO BE NOTIFIED WHEN RETURNING FROM THE POWER-SAVING STATE | — | NOT RECOVER (1273) |

T0: TIME OF ENTERING INTO THE POWER-SAVING STATE
T1: REFERENCE TIME
T2: TIMER SETTING TIME
T3: SCHEDULED PLAYBACK STOP TIME
t1: EVENT EXECUTION PERIOD
t2: RECOVERY PERIOD

FIG.26

NOTIFICATION TIMING
MANAGEMENT
INFORMATION 1430

| OS IDENTIFIER 1 | OS IDENTIFIER 2 | OS IDENTIFIER 3 |
|---|---|---|
| APPLICATION IDENTIFIER 1 | APPLICATION IDENTIFIER 2 | APPLICATION IDENTIFIER 3 |
| PROCESSING IDENTIFIER 1 | PROCESSING IDENTIFIER 2 | PROCESSING IDENTIFIER 3 |
| NOTIFICATION TIMING INFORMATION 1 | NOTIFICATION TIMING INFORMATION 2 | NOTIFICATION TIMING INFORMATION 3 |

DATA PROCESSING DEVICE FOR REDUCING POWER CONSUMPTION WHILE OPERATING A VIRTUALIZED ENVIRONMENT, AND A NON-TRANSITORY COMPUTER-READABLE RECORDING MEDIUM AND INTEGRATED CIRCUIT FOR PERFORMING THE SAME

TECHNICAL FIELD

The present invention relates to a technique that can be used by an apparatus that is equipped with a plurality of virtual machines by the application of virtualization techniques. The purpose of the technique that the present invention relates to is to notify any of the virtual machines about any changes made to data shared among the virtual machines.

BACKGROUND ART

Operating System (OS) for built-in apparatuses such as consumer products is now shifting from conventional real-time Operating Systems (RTOS) to general-purpose Operating Systems such as Linux™ and Symbian™. However, application programs have a program structure that depends on hardware and an OS. Therefore, in order to run an application program for the RTOS on a different OS, it is necessary to make some changes to the application in accordance with the different OS. Due to the shifting mentioned above, there is a problem that a heavy workload is required for porting the applications to the general-purpose OS.

As a solution for such a problem, there is a possibility that use of virtualization technique allows different OSs to operate on the same hardware without any changes to the existing OSs and application programs, and lightens the workload. Note that the virtualization technique is explained in detail on pages 38-45 of the Non-patent Document shown below.

For application of such a virtualization technique, in some cases, two application programs that run on different OSs have to share data and cooperate with each other. The Patent Document 1 shown below discloses a technique to handle this situation. According to the Patent Document 1, an inter-OS shared memory and an inter-OS notification function are included in an inter-OS control function for controlling operations of a plurality of OSs, and when one of the OSs changes the shared data, it notifies the other OSs about the change, using the inter-OS notification function.

FIG. 27 shows the shared-date change notification function disclosed in the Patent Document 1 as a conventional art. According to FIG. 7, a task C 2202 running on a first OS and a task D 2203 running on a second OS share data, using an inter-OS shared memory. Note that the inter-OS shared memory is a memory region obtained from a memory space shared between the first OS and the second OS. Firstly, the task C 2202 obtains the inter-OS shared memory. After that, when registering data with the obtained shared memory or changing the data, the inter-OS notification function notifies the task D 2203 about the registration or the change.

Patent Document 1: Japanese Laid-open Patent Application Publication No. 2001-243080
Patent Document 2: Japanese Laid-open Patent Application Publication No. 2000-347772
Non-patent Document 1: UNIX magazine, 2007-January issue, ASCII corp. (2007)

DISCLOSURE OF THE INVENTION

Problems to be Solved by the Invention

In the case of using the virtualization technique in apparatuses designed to be driven by a battery, such as mobile telephones, it is preferable that the virtual machine that is not in use is put into the power-saving state (i.e. the processor temporarily pauses the execution of the virtual machine) in order to reduce the battery consumption. However, according to the technique disclosed in the Patent Document 1, the task as the notification target is always notified of any changes to the data in the shared memory. Therefore, if such a function is applied in the above-mentioned mobile telephones or the likes, even the virtual machine that is in the power saving state for reducing the battery consumption is notified of the changes to the shared data. The virtual machine returns from the power-saving state to the normal state at every receipt of the notification, and notifies the notification target task about the changes to the shared data. As a result, in the case of frequently changing the shared data, there is a problem that the notification prevents the power saving.

In view of this problem, the object of the present invention is to provide a data processing apparatus, a data processing method, a data processing program, a recording medium and an integrated circuit that are capable of realizing notification of changes to data among virtual machines that share the data, interfering with the power-saving function as little as possible.

Means for Solving the Problem

To solve the problem mentioned above, one aspect of the present invention provides a data processing apparatus comprising: a playback unit operable to play back a content; a first virtual execution unit operable to switch an operation mode thereof between a normal state and a power-saving state, and to judge whether to permit continuation of playback of the content based on a duration of the playback determined by given information; a second virtual execution unit operable to make a change to the given information; and a virtual machine monitor including a memory to store the given information and operable to manage the first virtual execution unit and the second virtual execution unit, wherein before entering into the power-saving state, the first virtual execution unit notifies the virtual machine monitor of a time to return to the normal state from the power-saving state, and stays in the power-saving state until the time to return, the time being earlier than an end of the duration, and if the given information has been changed at the time to return, the virtual machine monitor notifies the first virtual execution unit of that the given information has been changed.

Here, the first virtual execution unit and the second virtual execution unit described above correspond to a first virtual execution unit 1501 and a second virtual execution unit 1502 respectively, which are explained in the first embodiment below. The function of the memory is achieved by the shared-data area 1255, and the function of the virtual machine monitor is achieved by the virtual machine monitor 1240.

Advantageous Effects of the Present Invention

With the stated structure, it is possible to keep the first virtual execution unit in the power-saving state, and it is possible to prevent interruption of the playback of the content because the change is not notified to the first virtual execution unit.

BRIEF DESCRIPTION OF THE DRAWINGS

FIG. 6 shows the structure of management information 1410 pertaining to the first embodiment of the present invention;

FIG. 7 shows details of a judgment criterion table stored in a resuming judgment unit 1244 pertaining to the first embodiment of the present invention;

FIG. 26 shows the structure of notification timing management information 1430 pertaining to the second embedment of the present invention.

EXPLANATION OF NUMERALS

Figure 1:
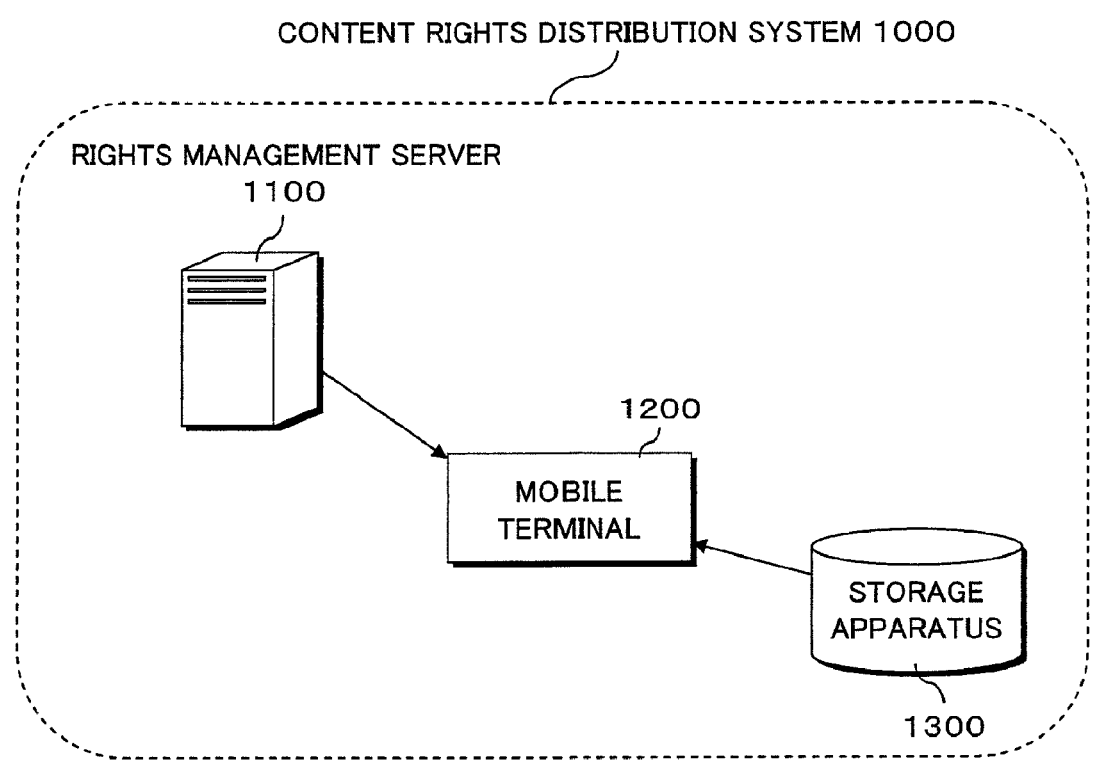
FIG. 1 shows an overall structure of a content rights distribution system 1000 pertaining to a first embodiment of the present invention.

1000 content rights distribution system
1100 rights management server
1200 mobile terminal
1210 DRM application
1211 playback application
1212 TPM module
1213 TPM module
1214 communication application
1220 RTOS
1221 general-purpose application
1222 TPM-OS
1230 virtual machine
1231 virtual machine
1232 virtual machine
1240 virtual machine monitor
1241 virtual machine management unit
1242 inter-VM notification management unit
1243 shared-data management unit
1244 resuming judgment unit
1245 scheduled interruption time acquisition unit
1246 waiting event storage unit
1250 hardware
1251 memory
1252 processor
1253 I/O device
1254 timer
1255 shared-data area
1256 TPM
1260 shared-data reservation unit
1261 shared-data changing unit
1262 management information holding unit
1263 data change notification unit
1264 notification timing information acquisition unit
1300 storage apparatus
1430 notification timing management information
1502 second virtual execution unit

BEST MODE FOR CARRYING OUT THE INVENTION

1. Embodiments

One aspect of the present invention is a data processing apparatus comprising: a playback unit operable to playback a content; a first virtual execution unit operable to switch an operation mode thereof between a normal state and a power-saving state, and to judge whether to permit continuation of playback of the content based on a duration of the playback determined by given information; a second virtual execution unit operable to make a change to the given information; and a virtual machine monitor including a memory to store the given information and operable to manage the first virtual execution unit and the second virtual execution unit, wherein before entering into the power-saving state, the first virtual execution unit notifies the virtual machine monitor of a time to return to the normal state from the power-saving state, and stays in the power-saving state until the time to return, the time being earlier than an end of the duration, and if the given information has been changed at the time to return, the virtual machine monitor notifies the first virtual execution unit of that the given information has been changed.

With the stated structure, the virtual machine monitor instructs the first virtual execution unit to return to the normal state from the power-saving state if any change has been made to the given information at the time to return, instead of immediately notifying the first virtual execution unit of the change and causes the first virtual execution unit to return to the normal state from the power-saving state upon the update. Accordingly, it is possible to keep the first virtual execution unit in the power-saving state while preventing that the playback of the content is interrupted because the first virtual execution unit is not notified of the update.

The first virtual execution unit may return to the normal state when notified by the virtual machine monitor of that the given information has been changed, and the first virtual execution unit may judge whether to permit the continuation of the playback based on the given information.

With the stated structure, the first virtual execution unit returns to the normal state from the power-saving state according to a notification from the virtual machine monitor, and judges to permit the continuation of the playback based on the given information stored in the memory. The update is not notified to the first virtual execution unit until the time to return and the first virtual execution unit can stay in the power-saving state. Accordingly, it is possible to keep the first virtual execution unit in the power-saving state while preventing that the playback of the content is interrupted because the first virtual execution unit is not notified of the update.

If the virtual machine monitor judges that the given information will not be changed until the time to return, the virtual machine monitor may notify the first virtual execution unit of that the given information has not been changed, and causes the first virtual execution unit to return to the normal state.

If the virtual machine monitor judges that the given information has been changed before the time to return, the virtual machine monitor may notify the first virtual execution unit of that the given information has not been changed, and causes the first virtual execution unit to return to the normal state.

With the stated structure, if the second virtual execution unit has made no change to the given information at the time to return, the virtual machine monitor instructs the first virtual execution unit to return to the normal state, and notifies the first virtual execution unit of that the second virtual execution unit has made no change to the given information.

The virtual machine monitor may store therein a first timing and a second timing, the first timing being a timing of causing the first virtual execution unit to return to the normal state in a case where the given information has not been changed, and of notifying the first virtual execution unit of that the given information has not been changed, and the second timing being a timing of causing the first virtual execution unit to return to the normal state in a case where the given information has been changed, and of notifying the first virtual execution unit of that the given information has been changed, and the first timing may be earlier than the second timing, and the second timing may be earlier than the time to return.

With the stated structure, the timing of causing the first virtual execution unit to the normal state is different in the case where any change has been made to the given information and in the case where no change has been made to the given information. If any change has been made to the given information, the first virtual execution unit is caused to return to the normal state early in consideration of a time required for updating the information. If no change has been made to the given information, the time for updating is not required and the period in the power-saving state can be extended. In this way, it is possible to extend the power-saving state to the maximum, and reduce the power consumption to the minimum.

If the second virtual execution unit has made any change to the given information at a time between the first timing and the second timing, the virtual machine monitor may immediately cause the first virtual execution unit to return to the normal state.

With the stated structure, if the second virtual execution unit has made any change to the given information between the first timing and the second timing, the first execution unit is caused to return to the normal state without waiting for the second timing. Therefore, although there is a possibility of an interruption of the playback of the content, it is possible to minimize the interruption.

To make a change to the given information, the second virtual execution unit may request the virtual machine monitor to make the change to the given information stored in the memory, and the virtual machine monitor may make the change to the given information based on the request.

With the stated structure of the virtualization technique, even if the memory in the virtual machine monitor can be updated only by the virtual machine monitor and it is the second virtual execution unit that updates the given information, the second virtual execution unit requests the virtual machine monitor to update the information in the memory and the virtual machine monitor judges whether the given information has been updated, based on the request. Therefore, in the virtualization technique, it is possible to efficiently keep the first virtual execution unit in the power-saving state while preventing that the playback of the content is interrupted.

The given information may be copyrights management information that relates to rights to use the content.

With the stated structure, the present invention is applicable to the case where the given information is copyrights management information that relates to rights to use the content.

The given information may be another content that follows the content.

This structure is applicable to the case where the given information is key information used for playback of another content that follows the content.

The playback unit may have a function to fast-forward the content, and in the normal state, the first virtual execution unit may judge whether to permit continuation of fast forwarding of the content based on the given information.

This structure is applicable to the case of fast-forwarding the content.

The virtual machine monitor may include a timer, and if the second virtual execution unit has made any change to the given information, the virtual machine monitor may acquire a length of a period until the time to return based on the timer, and notify the first virtual execution unit of that the second virtual execution unit has made any change to the given information based on the acquired length of the period.

This structure is applicable to the case where the virtual machine monitor is equipped with a timer.

The same advantageous effects can be achieved by embodying the present invention as a system, a method, a program, a recording medium and an integrated circuit.

2. The First Embodiment

The following explains a first embodiment of the present invention, with reference to the drawings.

2.1 The Structure of the Content Rights Distribution System 1000

FIG. 1 shows the structure of the content rights distribution system 1000 pertaining to the first embodiment. The following explains the overall structure of the content rights distribution system 1000, with reference to FIG. 1.

As FIG. 1 shows, the contents rights distribution system 1000 includes a rights management server 1100, a mobile terminal 1200, and a storage apparatus 1300.

The rights management server 1100 and the mobile terminal 1200 are connected to the network, and able to communicate with each other.

The storage apparatus 1300 is an apparatus for acquiring and storing contents. The storage apparatus 1300 stores therein contents that the mobile terminal 1200 can play back. Note that the contents stored in the storage apparatus 1300 have been acquired via a network or with use of a recording medium in advance, and they have been encrypted.

The content rights server 1100 is a server for managing rights information, which shows, for each of the contents stored in the storage apparatus 1300, whether or not playback of the content is permitted. Specifically, the rights information includes, for example, playback permission conditions such as a period for which the playback is permitted, a deadline, a playback count, duplication availability, and data to be used for decryption of the content.

The rights management server 1100 receives a request for rights information pertaining to playback of a content, from the mobile terminal 1200. On receipt of the request, the rights management server 1100 transmits, to the mobile terminal 1200, rights information of a content that corresponds to a content identifier included in the received request.

The mobile terminal 1200 transmits a request for rights information that corresponds to a content selected by a user's operation, to the rights management server 1100. The mobile terminal 1200 receives the rights information from the rights management server 1100, and playback the content stored in the storage apparatus 1300, according to the acquired rights information.

Obviously, the rights management server 1100 and the storage apparatus 1300 may be realized as a single server.

2.2 The Rights Management Server 1100

Figure 2:
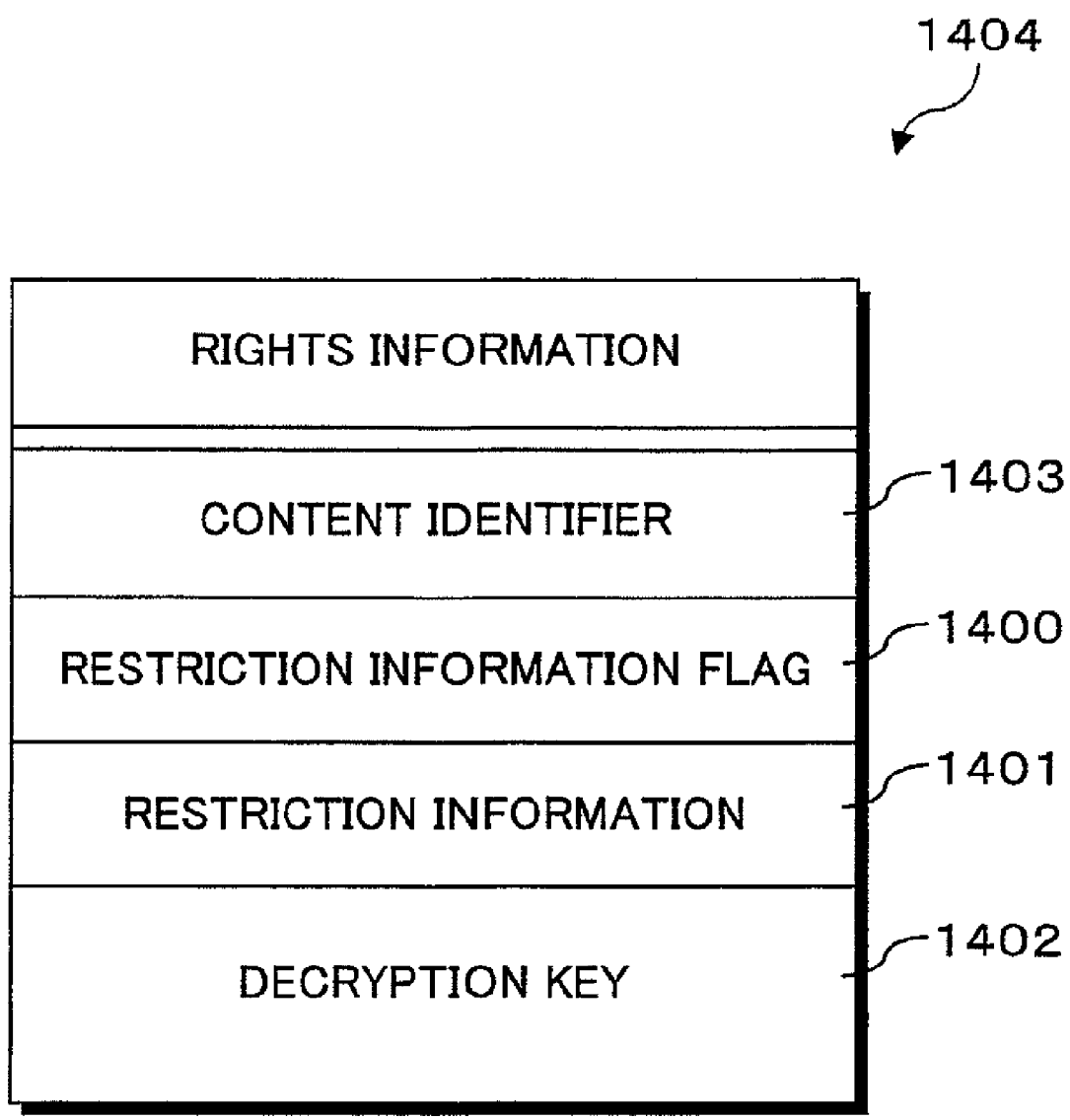
FIG. 2 shows the structure of rights information pertaining to the first embodiment of the present invention.

As described above, the rights management server 1100 stores rights information for each of the contents. FIG. 2 shows an example of the data structure of the rights information.

As FIG. 2 shows, the rights information 1404 includes a content identifier 1403, a restriction information flag 1400, restriction information 1401, and a decryption key 1402.

The content identifier 1403 indicates a content that uniquely corresponds to the rights information 1404. The restriction information 1401 represents restriction on playback of the content indicated by the content identifier 1403.

The restriction information is, for example, information about the deadline, such as "Playable until April 1", and the playback period such as "Playable for 30 minutes". Although only restrictions on the deadline and the period are mentioned here, there are merely examples. The restriction information 1401 may include another restriction such as the playback count or the duplication availability. Also, the restriction information 1401 may include a plurality of restrictions.

The restriction information flag 1400 indicates a type of the restrictions defined by the restriction information 1401. For example, a value "0" of the restriction information flag 1400 indicates that the restriction is about the deadline, and a value "1" of the restriction information flag 1400 indicates that the restriction is about the playback period. Although the restriction information flag 1400 explained here is one-bit data, this is merely an example. The restriction information flag may be any data as long as it identifies a type of the restriction.

The decryption key 1402 is key data to be used for decryption of the content indicated by the content identifier 1403.

The rights management server 1100 receives a request for rights information from the mobile terminal 1200. The request includes a content identifier. On receipt of the request, the rights management server 1100 reads rights information that includes the received content identifier. The rights management server 1100 generates encrypted rights information by encrypting the read rights information with use of a key that is unique to the mobile terminal 1200, and transmits the generated encrypted rights information to the mobile terminal 1200. Although it is described above that a key that is unique to the mobile terminal 1200 is used for the encryption, a shared key (session key) may be generated every time the management server 1100 communicates with the mobile terminal 1200 and used for the encryption. The key sharing is not explained here because it can be realized with techniques in the public domain.

2.3 The Mobile Terminal 1200

The mobile terminal 1200 accepts a designation of a content according to a user's operation, generates a request for rights information that corresponds to the designated content, and transmits the generated request to the rights management server 1100. Subsequently, the mobile terminal 1200 receives encrypted rights information from the rights management server 1100, and holds the received rights management information. Every time the mobile terminal 1200 plays back the content, it decrypts the encrypted rights information to generate rights information, decrypts the content with use of a decryption key included in the generated rights information, and plays back the content according to the restriction information.

The series of operations described above is realized by a processor executing a DRM application (described later) and a playback application (described later), each of which runs on a different virtual machine.

In the first embodiment, the mobile terminal 1200 holds the rights information in the encrypted state. However, any structure is acceptable as long as the rights information can be protected against unauthorized analysis. For example, the rights information, generated with the decryption, may be stored in a tamper-resistant storage area. If this is the case, it is unnecessary for the portable terminal 1200 to perform the decryption at use of the rights information.

Since the processing for the encryption and the decryption is not important for the present invention, the following omits the explanation of the decryption of the encrypted rights information performed at the playback of the content.

2.4 The Structure of the Mobile Terminal 1200

Figure 3:
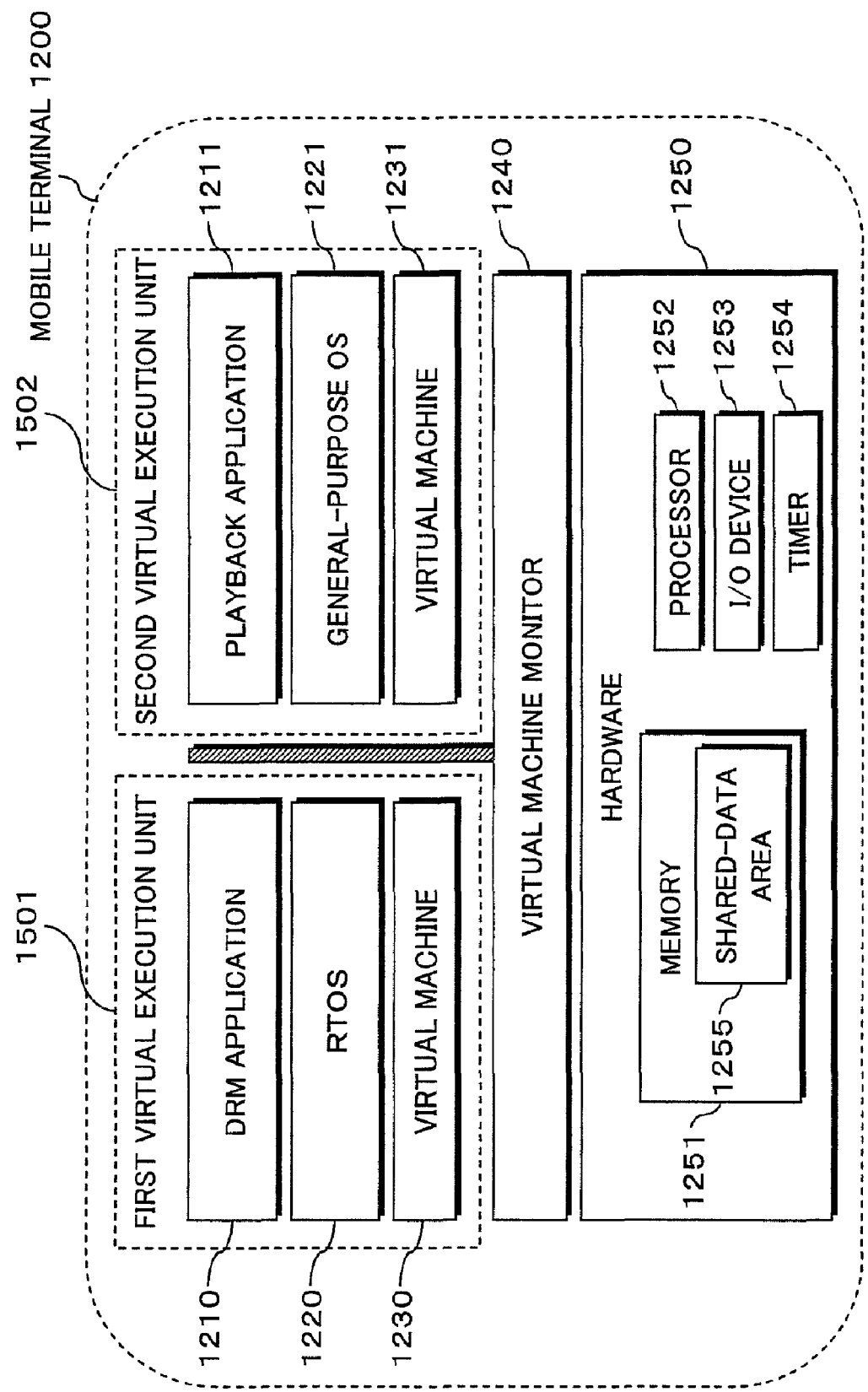
FIG. 3 shows the structure of a mobile terminal 1200 pertaining to the first embodiment of the present invention.

FIG. 3 shows the outline of the hardware structure and the software structure of the mobile terminal 1200. As FIG. 3 shows, the mobile terminal 1200 includes hardware 1250, a virtual machine monitor 1240 that runs on the hardware 1250, virtual machines 1230 and 1231, an RTOS 1220, a general-purpose OS 1221, a DRM application 1210 and a playback application 1211.

2.4.1 The Hardware 1250

The hardware 1250 includes a memory 1251 as a general-purpose memory, a processor 1252 that interprets and executes the above-mentioned programs, an I/O device 1253 that works as an interface to the outside such as the user and other devices, and a timer 1254 for interruption processing.

Here, the memory 1251 includes a shared-data area 1255. The shared-data area 1255 is a part included in the memory 1251, and both the virtual machines 1230 and 1231 can access the area. In this embodiment, the DRM application 1210 (described later) and the playback application 1211, each running on a different one of the virtual machines, use a shared-data area in order to share rights information that relates to playback of a content, and the shared-data area uniquely corresponds to the content. Although the memory 1251 illustrated in FIG. 2 includes only one shared-data area (1251), a plurality of shared-data areas may be provided for a plurality of contents on a one-to-one basis.

Also, although not specifically illustrated, the hardware 1250 includes a non-volatile memory (e.g. a ROM, a hard disk) that stores therein programs, acquired rights information and various types of data, and an internal clock that acquires a current time, a decoder that decodes contents, a playback mechanism that plays back the decoded audio and image data, and so on.

2.4.2 The Software

The following explains each piece of the software in detail. In this explanation, note that each software program is constituted of a plurality of instruction codes for assigned processing. The instruction codes are described in a computer-executable program language.

Also note that the virtual machine 1230 and the programs running on the virtual machine 1230 are collectively called as a first virtual execution unit 1501, and the virtual machine 1231 and the programs running on the virtual machine 1230 are collectively called as a second virtual execution unit 1502 when needed.

(1) Application Programs

Each of the DRM application 1210 and the playback application 1211 includes notification timing information. In the case where an event about which the application is to be notified occurs (e.g. change of rights information) under the condition that the application is in the idle state and the virtual machine that operates the application is in the power-saving state (described later), the notification timing information shows when the application and the virtual machine should be returned to the normal state and when the application should be notified of the event.

The notification timing information has the following three types, and identifiers "A", "B" and "C" are assigned to them respectively:

A: To be notified immediately
B: To be notified within a prescribed period
C: To be notified when returning from the power-saving state In this embodiment, it is specifically assumed that the DRM application 1210 includes the notification timing information "A: To be notified immediately". The playback application 1211 includes two pieces of the notification timing information, namely the notification timing information "B: To be notified within a prescribed period" and the notification timing information "C: To be notified when returning from the power-saving state". The initial value of the notification timing information is "C".

The DRM application 1210 and the playback application 1211 are application programs that cooperate with each other to perform processing relating to playback of contents. Therefore, when started up, each application program requests the OS, on which the application program runs, to reserve a shared-data area for each content. At this moment, each application program outputs the notification timing information thereof (the notification information of the playback application 1211 has the initial value "C") to the OS.

Next, each of the DRM application 1210 and the playback application 1211 receives an area identifier that shows the reserved shared-data area 1255 from the virtual machine monitor 1240, and stores therein the received area identifier.

The DRM application 1210 is application software that runs on the RTOS 1220, and includes processing procedures for acquiring and updating rights information pertaining to playback of contents.

Specifically, the DRM application 1210 receives a request for the rights information from the playback application 1211 or an instruction according to the user's operation, and generates a request for the rights information, which includes a content identifier indicating a certain content, and transmits the generated request to the rights management server 1100.

Subsequently, the DRM application 1210 receives the rights information of the content from the rights management server 1100, and stores the received rights information in the shared-data area 1255 via the virtual machine monitor 1240.

As explained with reference to FIG. 2, the rights information mentioned here is regarded as information relating to playback of contents. However, the rights information may be information showing other rights, such as rights to duplicate contents.

The playback application 1211 is application software that runs on the general-purpose OS 1221, and includes processing procedures for requesting the DRM application 1210 to acquire the rights information according to a user's operation. The playback application 1211 cooperates with the DRM application 1210. The request for the rights information, which the playback application 1211 outputs to the DRM application 1210, includes a content identifier and an area identifier. The content identifier is information for identifying a content designated by the user. The area identifier is information for uniquely indicating the shared-data area. Each of the playback application 1211 and the DRM application 1210 stores therein the area identifier and the content identifier in association with each other.

The playback application 1211 also includes processing procedures relating to playback control of contents, except for management of the rights information. Specifically, the playback application 1211 receives an instruction to play back a content according to a user's operation, acquires rights information that corresponds to the content indicated by the received playback instruction from the shared-data area 1255, and extracts a restriction flag and restriction information included in the acquired rights information. From the extracted restriction flag and restriction information, the playback application 1211 extracts the end time of the period in which playback of the content is permitted (which is hereinafter called "the playback stop time").

Next, the playback application 1211 sets the timer 1254 so as to stop the playback of the content at the playback stop time. For example, the playback application 1211 sets the timer 1254 to time out after a period obtained by subtracting "a return processing period" from the playback stop time.

Here, the return processing period is a period required for the virtual machine 1231 to return to the normal state from the power-saving state and for the playback application 1211 to return to the normal state from the idle state. The time set to the timer 1254 is hereinafter called "the timer setting time". Specifically, the playback application 1211 notifies the virtual machine monitor 1240 about the obtained timer setting time, via the general-purpose OS 1221 and the virtual machine 1231. A virtual machine management unit 1241 included in the virtual machine monitor 1240 sets the timer setting time to the timer 1254.

Next, the playback application 1211 outputs a request for changing notification timing information that corresponds to the content that is to be played back according to the instruction, to the virtual machine monitor 1240 via the general-purpose OS 1221 and the virtual machine 1231. The request output at this moment includes an area identifier that indicates the shared-data area that corresponds to the content, and notification timing information "B".

After output of the request for changing the notification timing information, the playback application 1211 instructs the decoder included in the hardware 1250 to perform decoding and playback of the content. During the playback of the content, it is unnecessary for the playback application 1211 to be operating. Therefore, the playback application 1211 enters into the idle state by itself and keeps in the state until the hardware 1250 finishes the processing. The playback application 1211 in the idle state returns to the normal state in response to interruption from the timer 1254 that has been set as described above, interruption by key-in by the user, and interruption from the virtual machine monitor 1240.

At the playback stop time, the playback application 1211 stops the playback of the content performed by the decoder. Next, the playback application 1211 outputs a request for changing notification timing information to the virtual machine monitor 1240 via the general-purpose OS 1221 and the virtual machine 1231. The request output at this moment is a command for changing the notification timing information, included in the management information corresponding to the content whose playback has been stopped, to the initial value "C".

In the first embodiment, only one application program runs on each OS. However, a plurality of application programs may run on each OS, as a matter of course.

In the explanation above, the shared-data area 1255 is reserved when the two application programs are started up, the rights information corresponding to the content designated by the user is acquired from the rights management server 1100, and the acquired rights information is written into the shared-data area 1255. However, the timing of reserving the shared-data area 1255 is not limited to when the application programs are started up. The shared-data area 1255 uniquely corresponding to each content may be newly reserved every time the user designates a content. Also, in the case where pieces of rights information that have been acquired in advance are stored in the hard disk, the shared-data area may be reserved for each piece of the right information when the application programs are started up.

(2) Operating System

The RTOS 1220 and the general-purpose OS 1221 are operating systems that make the DRM application 1210 and the playback application 1211 operate, and respectively operate on the virtual machine 1230 and the virtual machine 1231. Also, each of the RTOS 1220 and the general-purpose OS 1221 has an interface to the virtual machine monitor 1240 which is used for reserving the shared-data area 1255.

For example, the RTOS 1220 and the general-purpose OS 1221 are requested by the DRM application 1210 and the playback application 1211 to reserve the shared-data area 1255. Upon receipt of the request, the RTOS 1220 and the general-purpose OS 1221 request the virtual machine monitor 1240 to reserve the shared-data area 1255. At this moment, each of the RTOS 1220 and the general-purpose OS 1221 notifies the virtual machine monitor 1240, of an application identifier for identifying the application as the request source, the notification timing information received with the request, and an OS identifier for identifying the OS itself. As the application identifier, a process ID that the OS uses for identifying the application may be used.

Next, the RTOS 1220 and the general-purpose OS 1221 acquire the area identifier of the reserved shared-data area 1255 from the virtual machine monitor 1240, and notify the DRM application 1210 and the playback application 1211 about the area identifier.

Also, on receipt of the request to reserve the shared-data area 1255 from the DRM application 1210 and the playback application 1211, each of the RTOS 1220 and the general-purpose OS 1221 registers a callback function in a memory area that has been allocated to the OS itself, in association with the request source application, and the shared-data area 1255.

This call back function is used for notifying the DRM application 1210 and the playback application 1211 about any changes to the data in the shared-data area 1255. When an interruption showing the changes to the data in the share-data area 1255 occurs, each of the RTOS 1220 and the general-purpose OS 1221 calls and executes the call-back function that is associated with the shared-data area 1255, to notify the application under control of the OS about the changes to the data in the shared-data area 1255.

Also, the general-purpose OS 1221 puts the virtual machine 1231 into the power-saving state while all the application programs operating on the general-purpose OS 1221 (e.g. the playback application 1211) are in the idle state. Specifically, the general-purpose OS 1221 stops the processor virtualized by the virtual machine 1231. More specifically, during the operation of the processor 1252, for a period allocated for the operation of the virtual machine 1231, the processor 1252 temporarily pauses its operation (e.g. stops the output of the clock signal). More detailed explanation of the transition to the power-saving state is omitted here, because it is disclosed in the Patent Document 2.

The return from the power-saving state to the normal state is made on occurrence of interruption from the I/O device 1253 according to user's key-in, occurrence of interruption from the timer 1254 that has been set to stop the playback of the content, and receipt of a return request from the virtual machine monitor 1240.

Each of the RTOS 1220 and the general-purpose OS 1221 has an interface to the virtual machine monitor 1240. The DRM application 1210 and the playback application 1211 use the interfaces of the RTOS 1220 and the general-purpose OS 1221 respectively, to change the data in the shared-data area 1255. The RTOS 1220 and the general-purpose OS 1221 receive requests to change the data in the shared-data area 1255 from the DRM application 1210 and the playback application 1211 respectively. Upon receipt of the request, each OS requests the virtual machine monitor 1240 to change the data in the shared-data area 1255. At this moment, the virtual machine monitor 1240 is notified by each OS, of the application identifier that shows the request source application, the OS identifier that shows the OS, the area identifier that the OS has received from the request source application, and the data to be changed.

(3) The Virtual Machines

The virtual machines 1230 and 1231 are operating in the mobile terminal 1200, and provide virtual execution environments for the RTOS 1220 and the general-purpose OS 1221 respectively.

In the first embodiment, the mobile terminal 1200 includes two virtual machines. However, note that the mobile terminal 1200 may include three or more virtual machines.

(4) The Virtual Machine Monitor 1240

The virtual machine monitor 1240 is software for managing the virtual machines 1230 and 1231. For example, the virtual machine monitor 1240 manages the resources used by the virtual machine 1230 and the virtual machine 1231, such as the memory areas and the devices, and the scheduling of the virtual machines.

(4-1) The Functions of the Virtual Machine Monitor 1240

The virtual machine monitor 1240 receives a request to reserve the shared-data area from the RTOS 1220 and the general-purpose OS 1221. Upon receipt of the request, the virtual machine monitor 1240 reserves the shared-data area 1255 within the memory 1251, generates a shared-data area identifier that identifies the shows the reserved shared-data area 1255, and notifies the RTOS 1220 and the general-purpose OS 1221 about the generated shared-data area identifier.

Also, upon receipt of a request to change the data in the shared-data area 1255 from the RTOS 1220 and the general-purpose OS 1221, the virtual machine monitor 1240 changes the data in the shared-data area 1255, and generates an interruption for notifying the other virtual machines that are sharing the shared-data area 1255 about the change.

(4-2) The Structure of the Virtual Machine Monitor 1240

The following is a detailed explanation of the virtual machine monitor 1240 for realizing the above-described functions.

Figure 4:
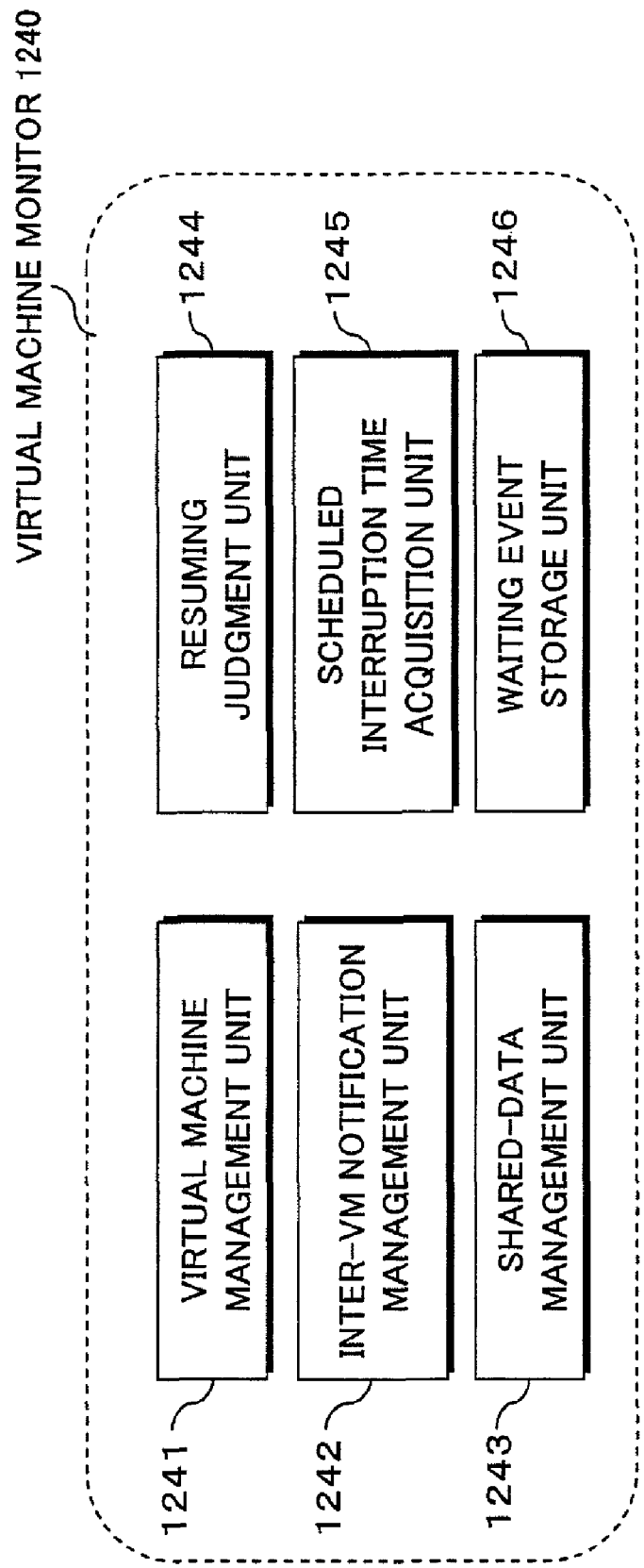
FIG. 4 shows the structure of a virtual machine monitor 1240 pertaining to the first embodiment of the present invention.

FIG. 4 is a block diagram showing the functional structure of the virtual machine monitor 1240 that supports the power-saving state of the first embodiment of the present invention.

As FIG. 4 shows, the virtual machine monitor 1240 includes a virtual machine management unit 1241, an inter-VM (Virtual Machine) notification management unit 1242, a shared-data management unit 1243, a resuming judgment unit 1244, a scheduled interruption time acquisition unit 1245, and a waiting event storage unit 1246.

Figure 5:
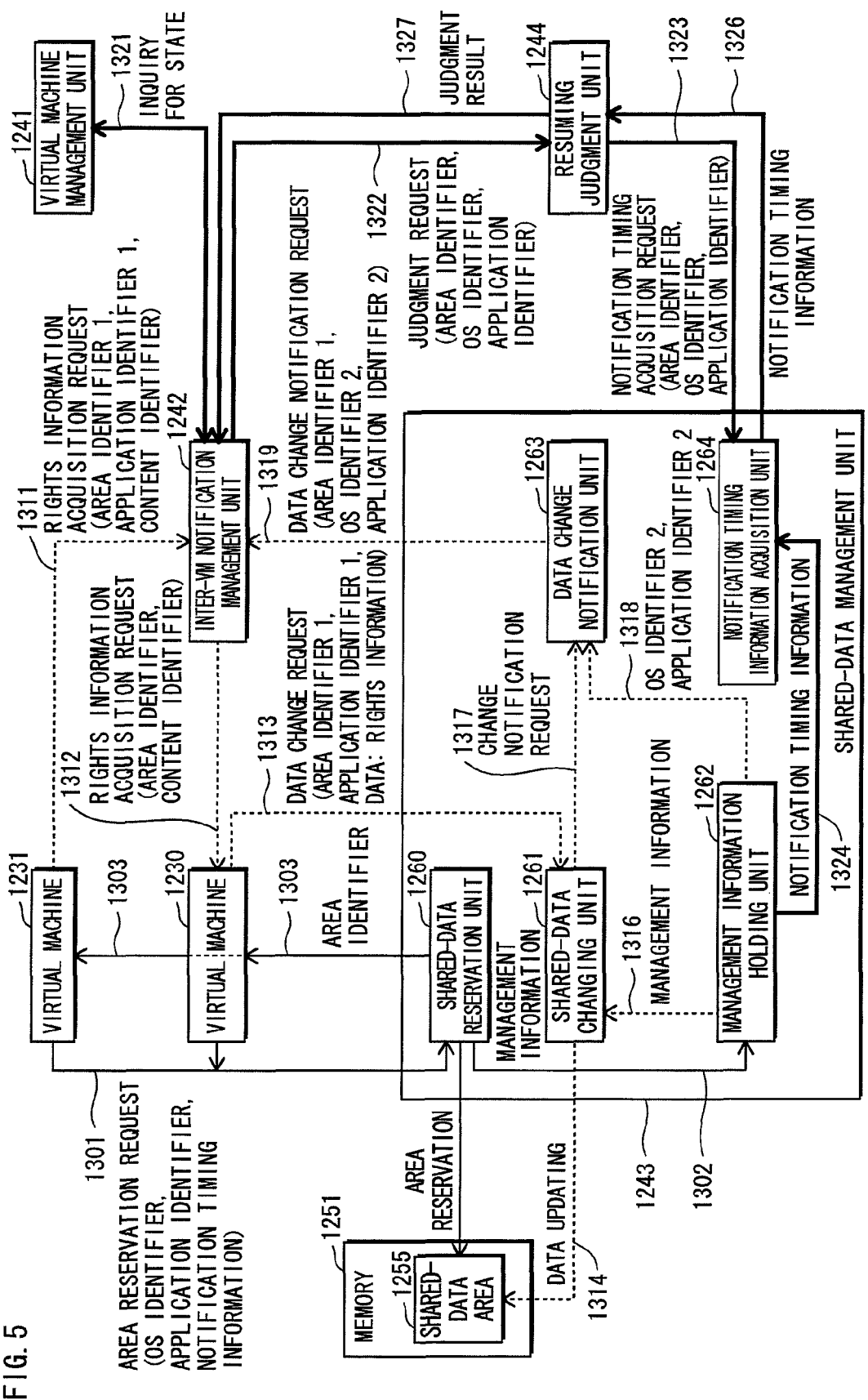
FIG. 5 shows the structure of a shared-data management unit 1243 pertaining to the first embodiment of the present invention, and a data flow within the shared-data management unit 1243.

Further, FIG. 5 is a block diagram showing the functional structure of the shared-data management unit 1243, and a data flow within the shared-data management unit 1243.

As FIG. 5 shows, the shared-data management unit 1243 includes, a shared-data reservation unit 1260, a shared-data changing unit 1261, a management information holding unit 1262, a data change notification unit 1263 and a notification timing information acquisition unit 1264.

The solid thin arrow in FIG. 5 shows a data flow relating to the reservation of the shared-data area. The dotted arrow in FIG. 5 shows a data flow relating to the changing of the rights information stored in the shared-data area 1255. The solid thick arrow in FIG. 5 shows a data flow relating to judgment on timing of outputting the various notifications to the virtual machine 1230 and the virtual machine 1231.

The following explains each component of the virtual machine monitor 1240, with reference to FIG. 4 and FIG. 5.

(4-2-1) The Virtual Machine Management Unit 1241

The virtual machine management unit 1241 manages the virtual machine 1230 and the virtual machine 1231, which run on the virtual machine monitor 1240. Specifically, the virtual machine management unit 1241 performs: the management of the memory areas used by the virtual machines; the allocation of the virtualized devices to the virtual machines; the mapping between the virtualized devices and the actual devices; the scheduling of the virtual machines; and the management of the states of the virtual machines. To perform the management of the state of the virtual machine 1231, the virtual machine management unit 1241 also refers to the timer setting time of the timer received from the playback application 1211.

Also, when the virtual machines return to the normal state from the power-saving state, the virtual machine management unit 1241 notifies the inter-VM notification management unit 1242 about the return.

(4-2-2) The Inter-VM Notification Management Unit 1242

As FIG. 5 shows, the inter-VM notification management unit 1242 receives a data change notification request 1319 from the shared-data management unit 1243. The data change notification request 1319 is a command for requesting notification of changes to the data stored in the shared-data area 1255. The data change notification request 1319 includes an area identifier 1, an OS identifier 2, and an application identifier 2. The area identifier 1 shows the shared-data area 1255. The OS identifier 2 and the application identifier 2 show the OS and the application as the notification targets respectively. Upon receipt of the data change notification request 1319, the inter-VM notification management unit 1242 notifies the virtual machine as the notification target about the change to the data, according to the state of the virtual machine.

Also, the inter-VM notification management unit 1242 mediates the requests between the virtual machine 1231 and the virtual machine 1230. For example, the inter-VM notification management unit 1242 receives a rights information request 1311 from the virtual machine 1231. The rights information request 1311 includes an area identifier 1, an application identifier 1 and a content identifier. The area identifier 1 shows the share-data area 1255 into which the acquired rights information is to be stored. The application identifier 1 is information showing the request source application. The content identifier is an identifier that shows the content corresponding to the rights information that is requested.

The inter-VM notification management unit 1242 outputs a rights information request 1312 to the virtual machine 1230 as the notification target, according to the state of the virtual machine 1230.

Specifically, in advance of the notification, the inter-VM notification management unit 1242 inquires of the virtual machine management unit 1241 about whether or not the virtual machine as the notification target is in the power-saving state (an inquiry 1321). As a result of the inquiry 1321, if the notification target virtual machine is in the normal state, the inter-VM notification management unit 1242 immediately outputs the received request to the notification target virtual machine.

If the notification target virtual machine is in the power-saving state, the inter-VM notification management unit 1242 outputs a judgment request 1322 to the resuming judgment unit 1244. The judgment request 1322 is a request to judge whether to recover the virtual machine from the power-saving state to the normal state. The judgment request 1322 includes the area identifier, output from the data change notification unit 1263 or the virtual machine, and the OS identifier and the application identifier. The OS identifier and the application identifier respectively show the notification target OS and application.

If receiving a judgment result 1327 showing "Immediately recover" from the resuming judgment unit 1244, the inter- VM notification management unit 1242 requests the virtual machine management unit 1241 to recover the notification target virtual machine from the power-saving state to the normal state. Next, immediately after the notification target virtual machine returns to the normal state, the inter-VM notification management unit 1242 notifies the recovered virtual machine about the received request.

If receiving a judgment result 1327 showing "Not recover" from the resuming judgment unit 1244, the inter-VM notification management unit 1242 stores the details of the request into the waiting event storage unit 1246, and reads the stored details when the virtual machine returns to the normal state from the power-saving state due to other factors (e.g. the timer interruption, the interruption by the user's operation, etc.)

(4-2-3) The Shared-Data Management Unit 1243

<The Outline of the Functions of the Shared-Data Management Unit 1243>

The shared-data management unit 1243 manages the shared-data area 1255. The shared-data management unit 1243 receives a request to reserve the shared-data area 1255 from the DRM application 1210 and the playback application 1211, reserves apart of the free area within the memory 1251 as the shared-data area 1255, and sets the access rights such that both the virtual machines 1230 and 1231 can access the shared-data area 1255.

The shared-data management unit 1243 manages, as management information for the shared-data area 1255, the OS identifier for identifying the OS running on each virtual machine, the application identifier for identifying the application software that runs on the OS and uses the shared-data area 1255, and the notification timing information that corresponds to the application. The group of these pieces of information is managed for each of a plurality of shared-data areas. An example data structure of the management information is illustrated in FIG. 6. The group of the pieces of information having the data structure shown in FIG. 6 is provided for each shared-data area. In other words, the management information 1410 is uniquely identified by the area identifier, and includes a plurality of groups consisted of the notification timing information and the identifiers of the OS and the application that use the shared-data area identified by the area identifier.

The shared-data management unit 1243 also receives a request to change the data in the shared-data area from the DRM application 1210 and the playback application 1211 via the RTOS 1220 and the general-purpose OS 1221. Upon receipt of the request to change the data, the shared-data management unit 1243 changes the data in the share-d data area 1255, and refers to the management information corresponding to the shared-data area 1255. Using the management information, the shared-data management unit 1243 acquires the identifiers of the application and the OS that are using the shared-data area 1255. After that, the shared-data management unit 1243 requests the inter-VM notification management unit 1242 to outputs, to each OS, an event that shows the change to the data in the shared-data area 1255.

The shared-data management unit 1243 also receives, from the DRM application 1210 and the playback application 1211, a request to change the notification timing information of an event. The request is made according to the operation state of the application. Upon receipt of the request from the DRM application 1210 and the playback application 1211, the shared-data management unit 1243 changes the notification timing information, included in the management information corresponding to the shared-data area 1255, to the designated notification timing information.

In the first embodiment, the notification timing information of the DRM application 1210 and the playback application 1211 is registered at the reservation of the shared-data area 1255. However, the present invention is not limited to this. At the reservation of the shared-data area 1255, a predetermined initial value may be set to the notification timing information for each application, and only the application that has to change the notification timing information from the initial value may request the shared-data management unit 1243 to change the notification timing information. If this is the case, the initial value of the notification timing information may be described in, for example, a setting file that is read when the system started up.

<The Structure of the Shared-Data Management Unit 1243>

The following explains the structure of shared-data management unit 1243 in the first embodiment in detail.

(a) The Shared-Data Reservation Unit 1260

The shared-data reservation unit 1260 receives an area reservation request 1301 to reserve the shared-data area, from the DRM application 1210 and the playback application 1211 via the RTOS 1220 and the general-purpose OS 1221. The area reservation request 1301 includes an OS identifier, an application identifier and notification timing information. The OS identifier and the application identifier show the OS and the application as the sources of the area reservation request 1301 respectively. The notification timing information is that described in the application indicated by the application identifier.

Upon receipt of the area reservation request 1301, the shared-data reservation unit 1260 reserves the shared-data area 1255 within a free area of the memory 1251.

Next, the shared-data reservation unit 1260 generates an area identifier corresponding to the reserved shared-data area 1255, and outputs the generated area identifier 1303 to the DRM application 1210 and the playback application 1211 via the RTOS 1220 and the general-purpose OS 1221.

Next, the shared-data reservation unit 1260 outputs management information 1302 to the management information holding unit 1262. The management information 1302 includes area information, the generated area identifier, an OS identifier, an application identifier, and notification timing information. The area information shows the position of the shared-data area 1255 within the memory 1251. The application identifier and the OS identifier are those included in the area reservation request 1301.

In some cases, the shared-data reservation unit 1260 receives the area reservation request together with the area identifier of the shared-data area that has been already reserved, from an application such as the DRM application 1210 and the playback application 1211 via the RTOS 1220 and the general-purpose OS 1221. In these cases, the shared-data reservation unit 1260 adds, to the management information 1410 that corresponds to the shared-data area 1255 and held by the management information holding unit 1262, the OS identifier that indicates the request source OS and the application identifier and the notification timing information included in the area reservation request. For example, in the case the mobile terminal 1200 includes a third OS and a third virtual machine in addition to the RTOS 1220 and the general-purpose OS 1221, and an application that runs on the third OS, started up after the shared-data area 1255 was reserved, uses the shared-data area 1255.

(b) The Management Information Holding Unit 1262

The management information holding unit 1262 receives the management information 1302, which is required for management of the shared-data area 1255 reserved within the memory 1251, from the shared-data reservation unit 1260, and hold therein the received management information 1302.

FIG. 6 shows the details of the management information 1410 corresponding to the shared-data area 1255. As FIG. 6 shows, the management information 1410 includes an area identifier 1 (1411), area information 1 (1412), an OS identifier 1 (1413), an application identifier 1 (1414), notification timing information 1 (1416), an OS identifier 2 (1417), an application identifier 2 (1418), and notification timing information 2 (1419).

The management information 1410 is the same as the management information 1302 output from the shared-data reservation unit 1260.

The area identifier 1 (1411) is an identifier that uniquely shows the shared-data area 1255. The area information 1 (1412) is data that shows the position of the shared-data area 1255 within the memory 1251. In FIG. 6, the management holding unit 1262 holds therein the start address and the end address of the shared-data area 1255, as the area information.

The OS identifier, the application identifier and the notification timing information form a group, and they are respectively information for identifying the application that has requested the reservation of the shared-data area 1255, information identifying the OS on which the application runs, and notification timing information that has been output together with the request. In FIG. 6, the OS identifier 1 (1413) indicates the RTOS 1220. The application identifier 1 (1414) indicates the DRM application 1210. The notification timing information 1 (1416) indicates "A" which is described in the DRM application 1210. Further, the OS identifier 2 (1417) indicates the general-purpose OS 1221. The application identifier 2 (1418) indicates the playback application 1211. The notification timing information 2 (1418) indicates the initial value "C" which is described in the playback application 1211.

If a plurality of shared-data areas are reserved in the memory 1251, the management information holding unit 1262 holds therein the management information having the structure shown in FIG. 6 for each of the shared-data area.

(c) The Shared-Data Changing Unit 1261

The shared-data changing unit 1261 receives a data change request 1313 to change the data in the shared-data area 1255, from the DRM application 1210 and the playback application 1211 via the RTOS 1220, the general-purpose OS 1221, the virtual machine 1230 and the virtual machine 1231.

For example, the shared-data changing unit 1261 receives a request to change the data in the share-data area 1255 from the DRM application 1210 via the RTOS 1220 and the virtual machine 1230. The received data change request 1313 includes an area identifier 1, an application identifier 1 and data (e.g. rights information). The area identifier 1 indicates the shared-data area 1255. The application identifier 1 indicates the DRM application 1210. The data (assumed here as the rights information acquired from the rights management server 1100) is data to be newly written into the shared-data area 1255.

Upon receipt of the request, the shared-data changing unit 1261 acquires the management information 1410 corresponding to the area identifier 1 from the management information holding unit 1262, identifies the shared-data area 1255 on the memory 1251 based on the area information 1 (1412) included in the acquired management information 1410, and changes the rights information in the shared-data area 1255 based on the received rights information.

The shared-data changing unit 1261 also extracts the OS identifier 1 (1413) corresponding to the DRM application 1210 as the request source, from the acquired management information 1410. Next, the shared-data changing unit 1261 generates a change notification request that includes the area identifier 1 and the application identifier 1, included in the received data change request, and the extracted OS identifier 1 (1413), and outputs the generated change notification request 1317 to the data change notification unit 1263.

(d) The Data Change Notification Unit 1263

As FIG. 5 shows, the data change notification unit 1263 receives the change notification request 1317 from the shared-data changing unit 1261. The change notification request 1317 includes the area identifier 1, the OS identifier 1, and the application identifier 1.

Upon receipt of the change notification request 1317, the data change notification unit 1263 acquires the management information 1410 corresponding to the area identifier 1 included in the change notification request 1317, from the management information holding unit 1262. Then, among the OS identifiers and the application identifiers included in the acquired management information 1410, the data change notification unit 1263 acquires the OS identifier 2 (1417) and the application identifier 2 (1418), apart from the OS identifier 1 and the application identifier 1.

Next, the data change notification unit 1263 generates a data change notification request that includes the area identifier 1 included in the change notification request 1317 and the extracted OS identifier 2 (1417) and application identifier 2 (1418). The data change notification request is a command for making a request to notify, via the general-purpose OS 1221 indicated by the OS identifier 2, the playback application 1211 indicated by the application identifier 2 about that the shared-data area 1255 indicated by the area identifier 1 has been changed.

The data change notification unit 1263 outputs the generated data change notification request 1319 to the inter-VM notification management unit 1242.

(a) The Notification Timing Information Acquisition Unit 1264

The notification timing information acquisition unit 1264 receives a notification timing acquisition request 1323 to acquire the notification timing information, from the resuming judgment unit 1244. The notification timing acquisition request 1323 includes an area identifier, an OS identifier and an application identifier.

Upon receipt of the notification timing acquisition request 1323, the notification timing information acquisition unit 1264 detects the management information that includes the received area identifier from the pieces of management information held by the management information holding unit 1262. From the detected management information, the notification timing information acquisition unit 1264 extracts the notification timing information 1324 corresponding to the received OS identifier and application identifier. Next, the notification timing information acquisition unit 1264 outputs the extracted notification timing information 1326 (the same as 1324) to the resuming judgment unit 1244.

(4-2-4) The Resuming Judgment Unit 1244

The resuming judgment unit 1244 is a functional unit that judges whether to immediately recover the virtual machine, as the notification target of the event, from the power-saving state to the normal state. Here, the event is, for example, change to the data in the shared-data area 1255, and various requests between the virtual machines.

The resuming judgment unit 1244 receives a judgment request 1322 from the inter-VM notification management unit 1242. The judgment request 1322 includes an area identifier, an OS identifier, and an application identifier. The area identifier indicates the shared-data area relating to the event.

The OS identifier and the application identifier indicate the OS and the application as the notification target of the event respectively.

Upon receipt of the judgment request 1322, the resuming judgment unit 1244 generates a notification timing acquisition request 1323. The notification timing acquisition request 1323 includes the received area identifier, OS identifier, and application identifier. Next, the resuming judgment unit 1244 outputs the generated notification timing acquisition request 1323 to the notification timing information acquisition unit 1264 included in the shared-data management unit 1243.

Next, the resuming judgment unit 1244 receives the notification timing information 1326 from the notification timing information acquisition unit 1264. Using the received notification timing information and a judgment criterion table illustrated in FIG. 7, the resuming judgment unit 1244 judges whether to immediately recover the notification-target virtual machine from the power-saving state to the normal state.

As FIG. 7 shows, the judgment criterion table 1270 includes three pieces of judgment criterion information, namely judgment criterion information 1271, judgment criterion information 1272 and judgment criterion information 1273. The judgment criterion information 1271 and the judgment criterion information 1273 each include notification timing information, an identifier of the notification timing information and a judgment result.

The judgment criterion information 1272 includes an identifier, notification timing information, and two pairs of a time criterion and a judgment result.

As described above, there are three types of notification timing information. The identifiers "A", "B" and "C" are assigned to the three types respectively.

the time criterion is provided if the notification timing information received from the notification timing information acquisition unit 1264 is "B: To be notified within a prescribed period". The time criterion is described later in detail.

The judgment result is the result of the judgment determined based on the notification timing information and the time criterion, and indicates "Recover immediately" or "Not recover".

If the notification timing information 1326 received from the notification timing information acquisition unit 1264 indicates "A: To be notified immediately", the resuming judgment unit 1244 refers to the judgment criterion information 1271, and outputs the judgment result "recover immediately" 1327 to the inter-VM notification management unit 1242.

Here, an event that is "to be notified immediately" is that should be performed by applications in synchronization, such as an event where the playback application 1211 requests the DRM application 1210 to purchase the rights.

If the notification timing information 1326 received from the notification timing information acquisition unit 1264 indicates "C: To be notified when returning from the power-saving state", the resuming judgment unit 1244 refers to the judgment criterion information 1273 of the judgment criterion table 1270, and outputs the judgment result "Not recover" 1327 to the inter-VM notification management unit 1242.

Here, an event that is "to be notified when returning from the power-saving state" is, for example, an event of notifying change to the right information at the purchase of the rights of content that has not been played back. In this case, to playback the content, the user has to perform key-in to operate the playback application 1211. Accordingly, an interruption by the I/O device 1253 due to the key-in occurs before the playback of the content. This interruption recovers the virtual machine from the power-saving state, and it is early enough to notify the virtual machine of the change to the rights information at this moment.

If the notification timing information 1326 received from the notification timing information acquisition unit 1264 indicates "B: To be notified within a prescribed period", the resuming judgment unit 1244 performs the following operations.

Here, an event that is "to be notified within a prescribed period" is, for example, an event of notifying the change to the rights information stored in the shared-data area 1255 when the rights of the content being played back is additionally purchased. The following specifically explains the case of judging whether to immediately recover the virtual machine 1231 in the power-saving state in order to notify the change to the rights information when the rights of the content being played back is additionally purchased.

Figure 8:
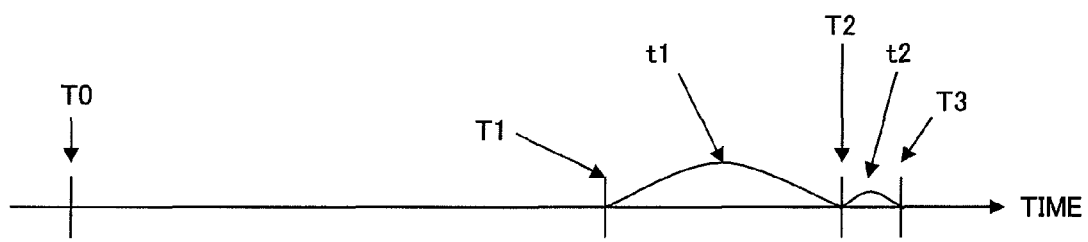
FIG. 8 shows a relation among times and periods used by the resuming judgment unit 1244, which has received notification timing information "B", to make a judgment.

FIG. 8 shows the relation among the times and the periods used by the resuming judgment unit 1244, which has received the notification timing information "B", to make the judgment. In FIG. 8, the time T0 is a time when the virtual machine 1231 as the notification target of the event enters into the power-saving state. The time T3 is a time at which the playback of the content is to be stopped (scheduled playback stop time), which is determined by the rights information that has not been changed. The period t2 is a time period required for the virtual machine in the power-saving state to return to the normal state (recovery period).

The time T2, which precedes the time T3 by the period t2, is a time at which the interruption is to be caused by the timer 1254 (hereinafter called "the timer setting time"). This has been set by the playback application 1211. The period t1 is a time period required for execution of the event where the playback application 1211 is notified of the change to the rights information via the virtual machine 1231 after the virtual machine 1231 returns to the normal state (event execution period). The time T1 precedes the time T2 by the period t1. The time T1 determined in this way is called the reference time.

In FIG. 8, the notification event of the change to the rights information of the content being played back is only required to be completed before the scheduled playback stop time T3 determined by the rights information that has not been changed. Accordingly, if the recovery of the virtual machine 1231 from the power-saving state to the normal state is stated before the reference time T1, the playback application 1211 recovered from the idle state recalculates the scheduled playback stop time with reference to the changed rights information. As a result, it is possible to continue the playback of the content without stopping it at the time T3. Therefore, the judgment result varies based on whether the time of receipt of the judgment request 1322 is after the reference time T1 or before the reference time T1.

First, the resuming judgment unit 1244 instructs the scheduled interruption time acquisition unit 1245 to acquire the scheduled interruption time, and receives the timer setting time T2 as the scheduled interruption time from the scheduled interruption time acquisition unit 1245. Upon receipt of the timer setting time T2, the resuming judgment unit 1244 calculates the reference time T1 by subtracting the event execution time t1 from the time T2. The event execution time t1 is a time determined when the system was designed, and may be prestored in the resuming judgment unit 1244, or received from the inter-VM notification management unit 1242 together with the judgment request.

Next, the resuming judgment result 1244 acquires the current time Tn from the internal clock, and compares the acquired current time with the reference time T1.

Figure 9:
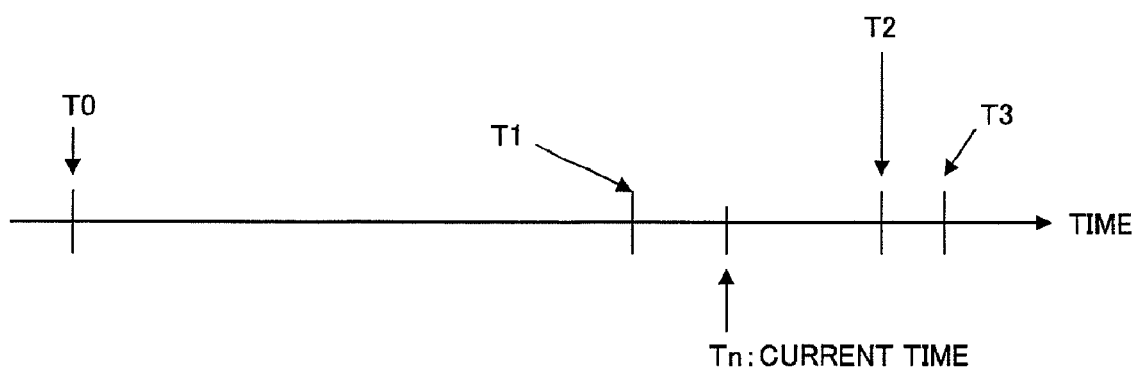
FIG. 9 shows an example order of a current time Tn and a reference time T1.

As a result of the comparison, if Tn≧T1, the resuming judgment unit 1244 refers to the judgment criterion information 1272, and extracts the time criterion "current time≧reference time" and the corresponding judgment result "Recover immediately". The resuming judgment unit 1244 outputs the extracted judgment result "Recover immediately" to the inter-VM management unit 1242. FIG. 9 shows an example order of the current time Tn and the reference time T1. As FIG. 9 shows, the current time Tn is between the reference time T1 and the timer setting time T2. In this case, it is impossible to complete the change notification of the rights information before the time setting time T2. Accordingly, it is necessary to immediately recover the virtual machine 1232 from the power-saving state to the normal state.

Figure 10:
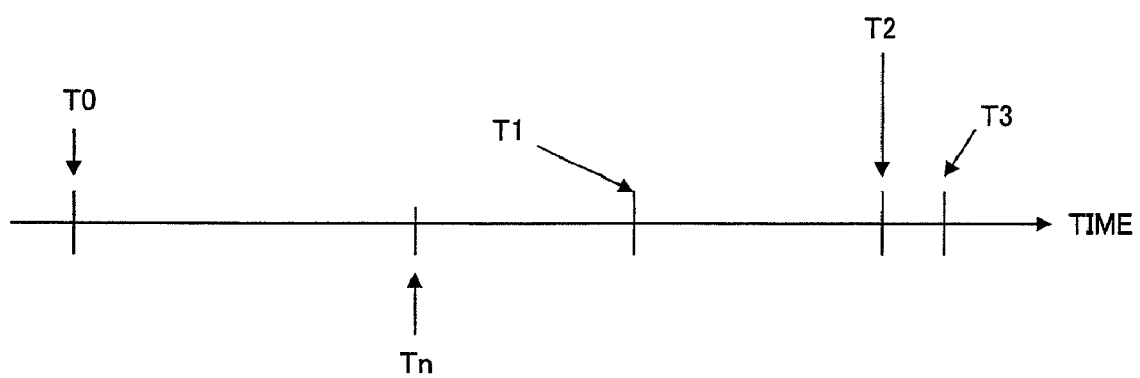
FIG. 10 shows an example order of the current time Tn and the reference time T1.
Figure 11:
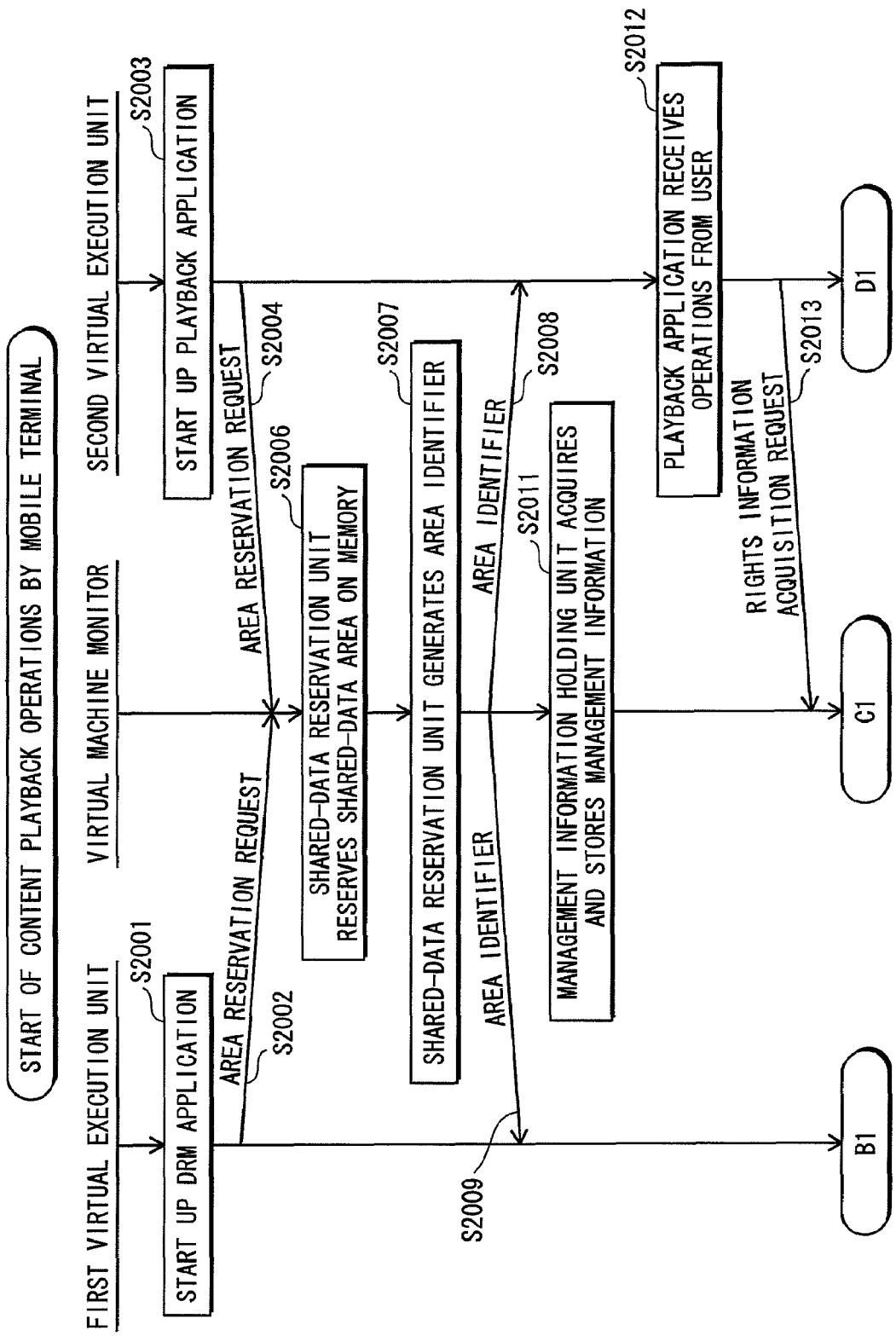
FIG. 11 is a flowchart showing operations for content playback performed by the mobile terminal 1200 pertaining to the first embodiment of the present invention.
Figure 12:
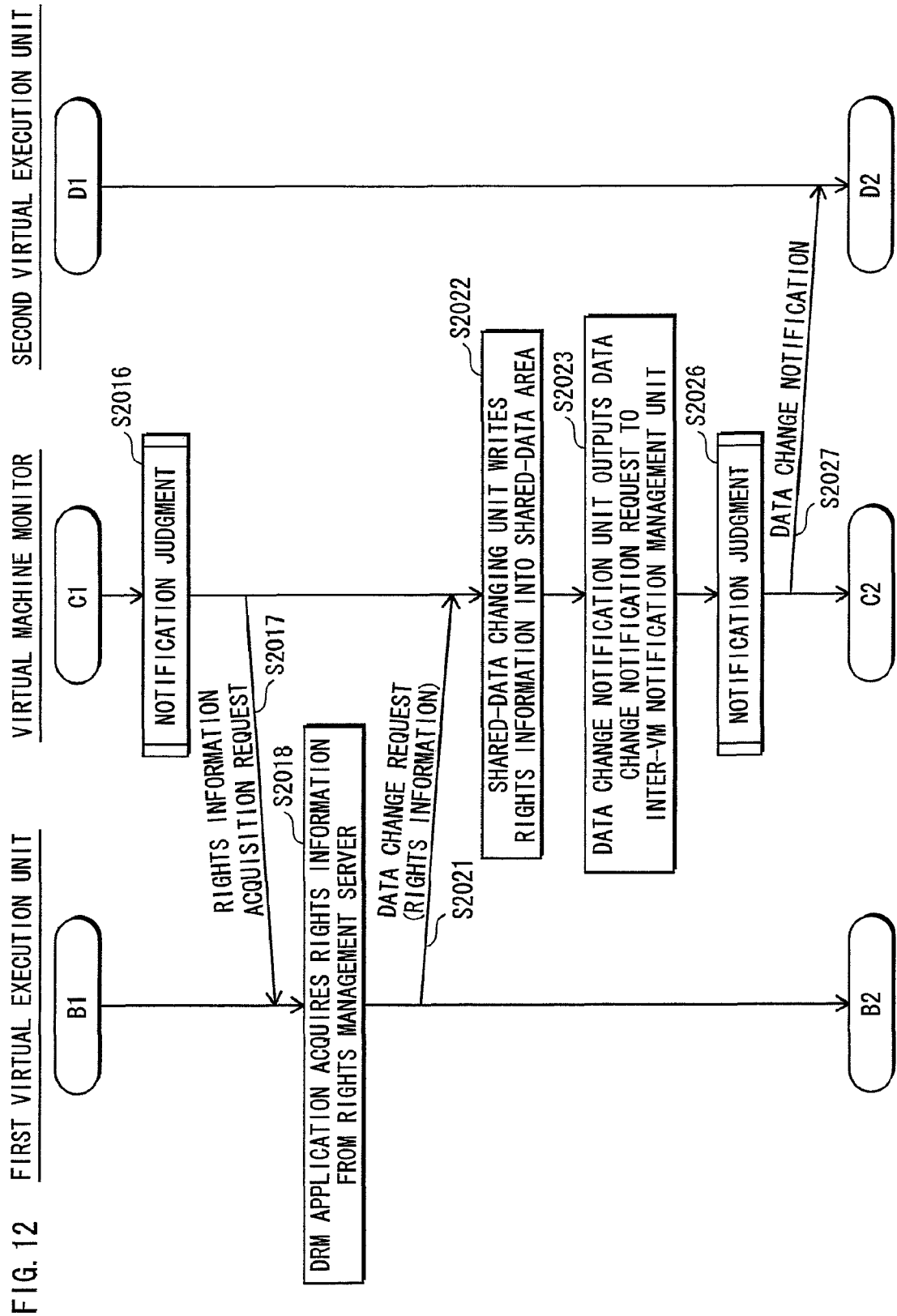
FIG. 12 is a flowchart showing operations for the content playback performed by the mobile terminal 1200 pertaining to the first embodiment of the present invention, continued from FIG. 11.
Figure 13:
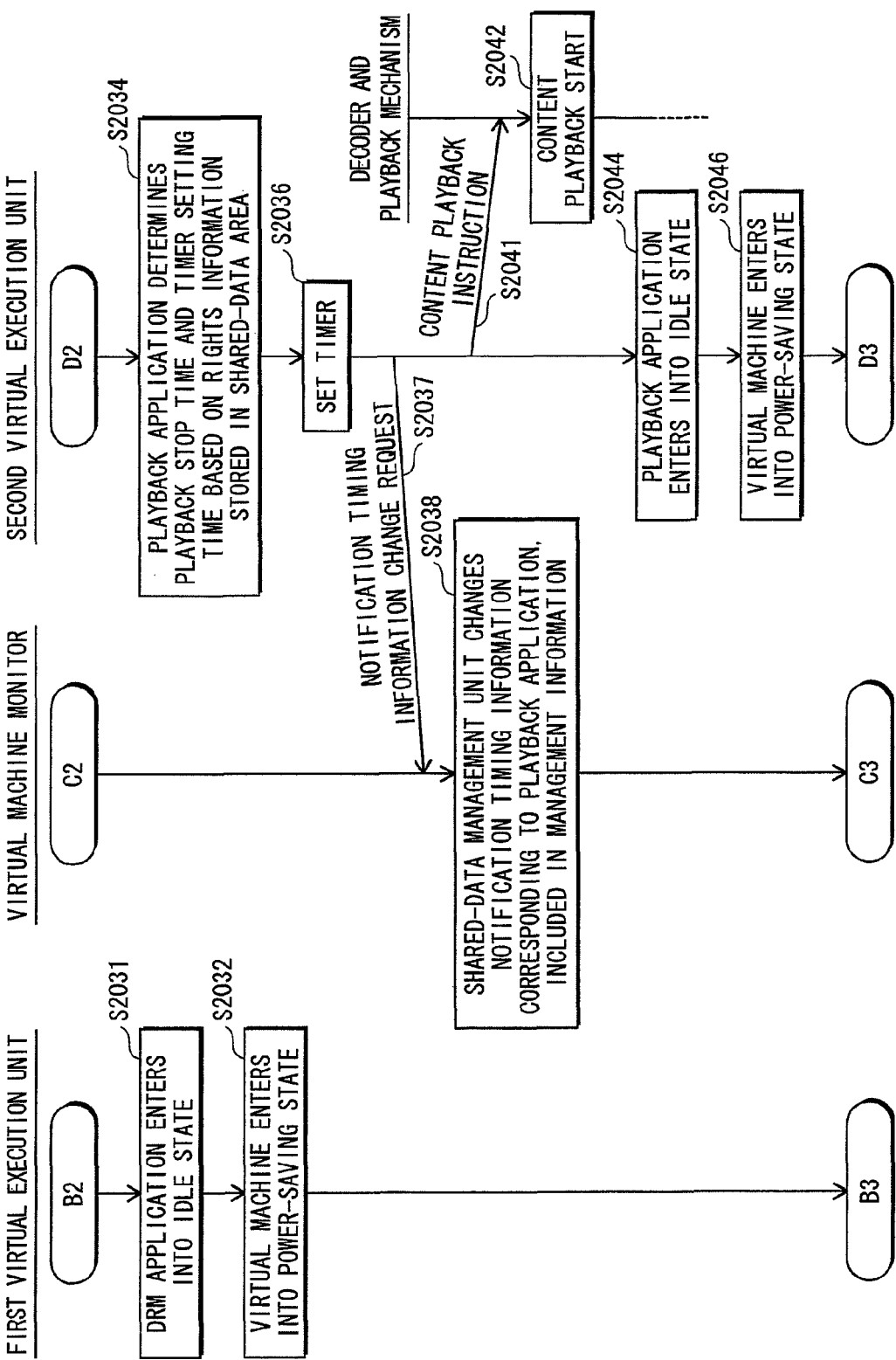
FIG. 13 is a flowchart showing operations for the content playback performed by the mobile terminal 1200 pertaining to the first embodiment of the present invention, continued from FIG. 12.
Figure 14:
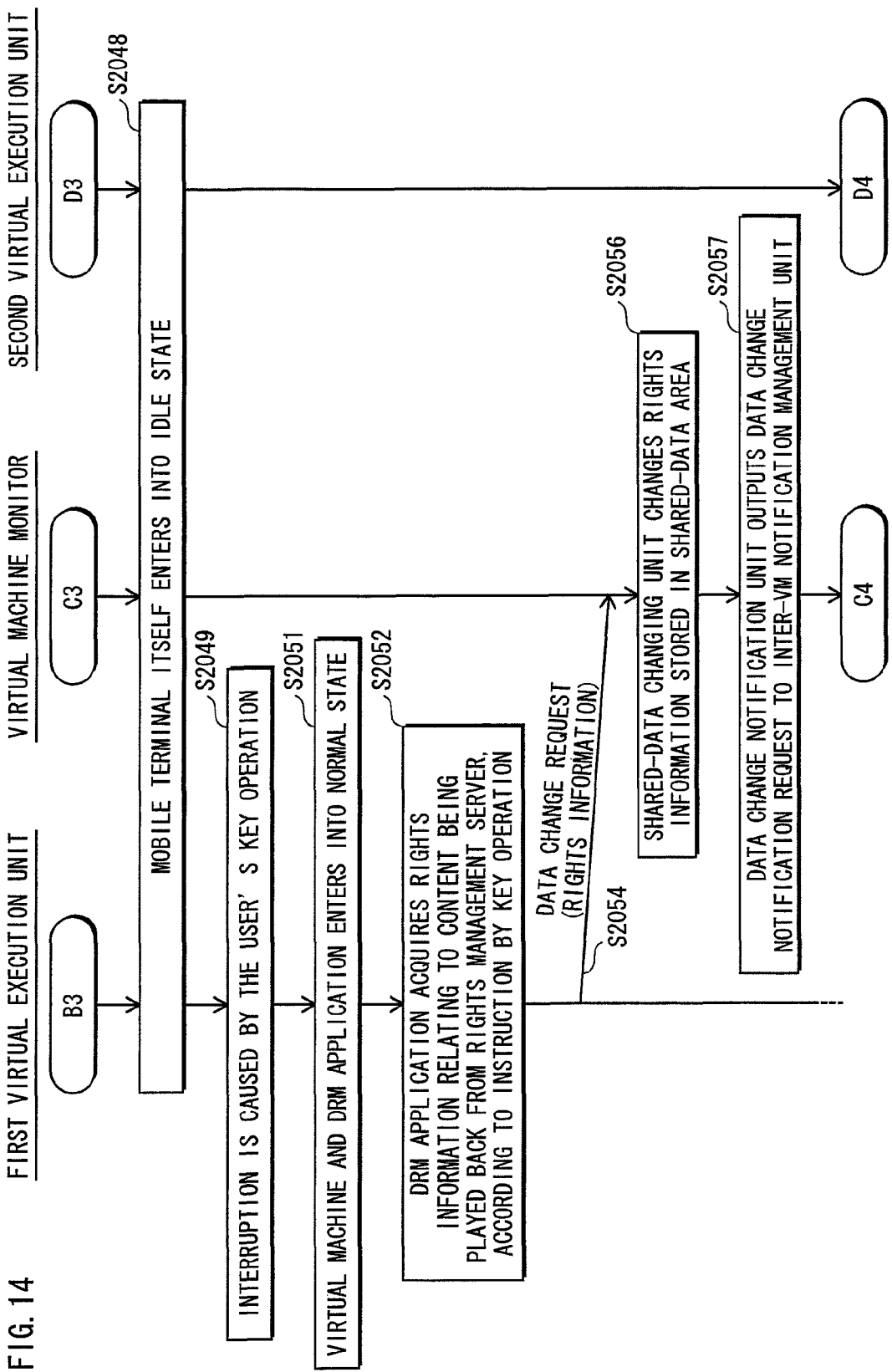
FIG. 14 is a flowchart showing operations for the content playback performed by the mobile terminal 1200 pertaining to the first embodiment of the present invention, continued from FIG. 13.
Figure 15:
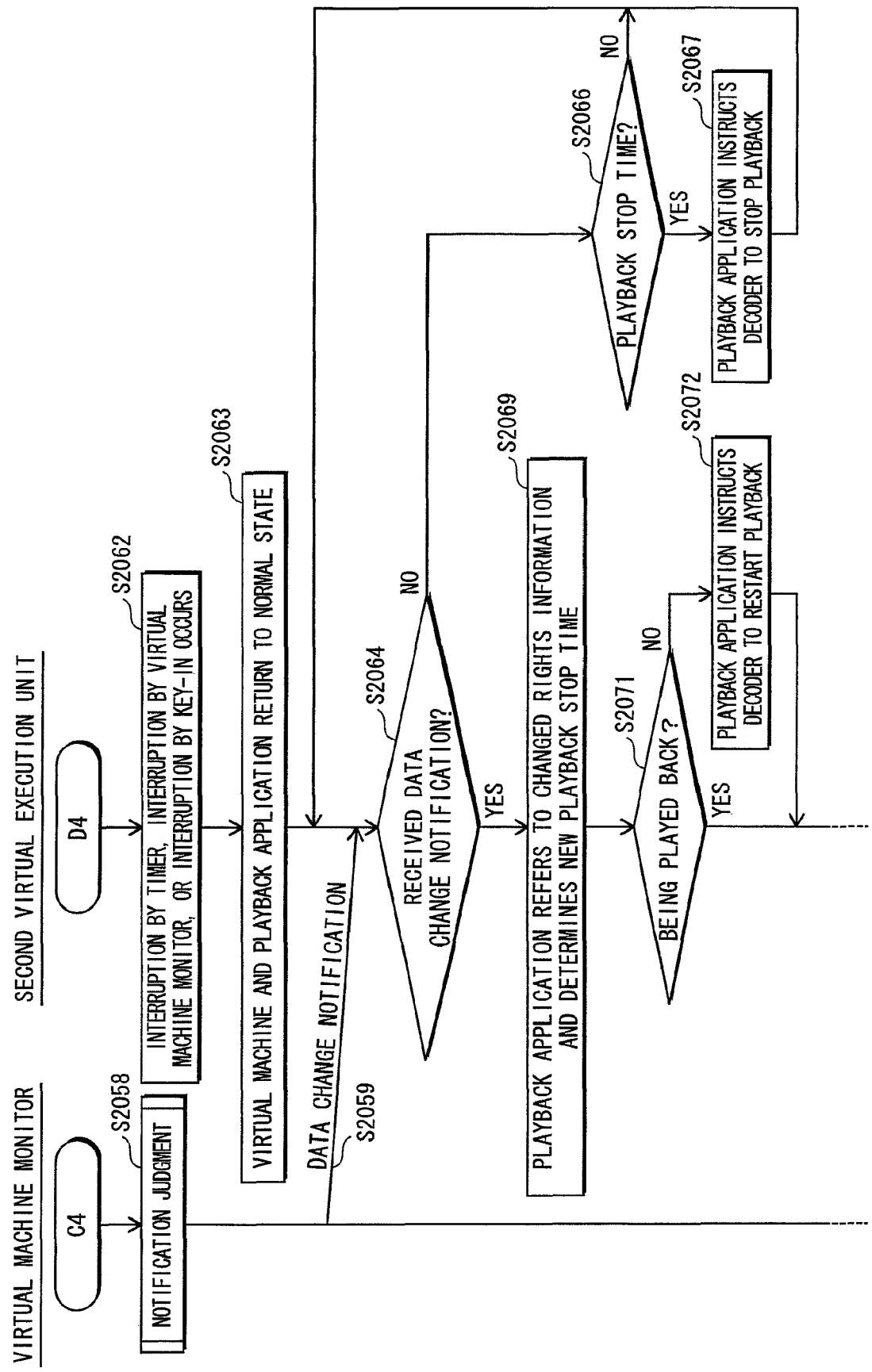
FIG. 15 is a flowchart showing operations for the content playback performed by the mobile terminal 1200 pertaining to the first embodiment of the present invention, continued from FIG. 14.

As a result of the comparison, if Tn<T1, the resuming judgment unit 1244 refers to the judgment criterion information 1272, and extracts the judgment result "Not recover" corresponding to the time criterion "current time<reference time". Next, the resuming judgment unit 1244 outputs the extracted judgment result "Not recover" to the inter-VM notification management unit 1242. Next, the resuming judgment unit 1244 changes the time set to the timer 1254 to the reference time T1. FIG. 10 shows an example order of the current time Tn and the reference time T1. As FIG. 10 shows, the current time Tn is before the reference time T1. If this is the case, the recovery of the virtual machine 1231 is only required to be started before the reference time T1. Therefore, it is unnecessary to immediately recover the virtual machine 1231.

In the first embodiment, it is assumed that the event execution period t1 was determined when the system was designed. However, the present invention is not limited to this. The event execution period t1 may be input from the outside when the system is started up, in the form of a setting file or the like. Alternatively, it may be input from the outside of the virtual machine monitor 1240 during the operation of the system. Also, it is not necessary that only a single event execution period t1 is used in the whole system. A different event execution period may be set for each event by the application programs. If this is the case, the event execution period may be included in the management information together with the notification timing information, and managed by the shared-data management unit 1243. Note that the event execution period may be determined by the application program during the operation according to the operation state, or determined based on a setting file that is read when the application program is started up.

Also, it is possible that the judgment on the recovery from the power-saving state is performed without consideration of the event execution period. However, if this is the case, the playback of the content will be interrupted for the event execution period, between the running out of the rights information before the change and the reflection of the new rights information.

The event execution period t1 is explained above as a time period required for execution of the event where the playback application 1211 is notified of the change to the rights information via the virtual machine 1231. However, in addition to the time period required for the notification, the time period for which the playback application 1211 refers to the change rights information may be included in the event execution period t1.

(4-2-5) The Scheduled Interruption Time Acquisition Unit 1245

The scheduled interruption time acquisition unit 1245 receives an instruction to acquire the scheduled interruption time, from the resuming judgment unit 1244. Upon receipt of the instruction, the scheduled interruption time acquisition unit 1245 accesses the timer 1254 to acquire the time set to the timer 1254 (the timer setting time), and outputs the acquired timer setting time to the resuming judgment unit 1244.

In the first embodiment, the scheduled interruption time, at which the virtual machine recovers from the power-saving state to the normal state, is acquired from the timer 1254. However, the present invention is not limited to this. In the case of using the DMA (Direct Memory Access) transfer for the playback of the content, the virtual machine may be recovered from the power-saving state by interruption at the completion of the transfer. If this is the case, it is possible to use a method for obtaining the scheduled interruption time by acquiring the remaining data size to be transferred by the DMA transfer, converting the size into a time, and calculates the scheduled interruption time based on the time resultant from the conversion.

(4-2-6) The Waiting Event Storage Unit 1246

The waiting event storage unit 1246 has event cues for each virtual machine. Each event cue stores an event that has been registered as a waiting event by the inter-VM notification management unit 1242.

2.5 Operations of the Mobile Terminal

The following explains the operations performed by the mobile terminal 1200, with reference to drawings.

(1) Operations for the Content Playback

FIG. 11 to FIG. 15 show the operations for playing back the content, performed by the mobile terminal 1200. In the following explanation, the virtual machine and the OS and the software group including one or more application programs are collectively called as a virtual execution unit. Specifically, the virtual machine 1230, the RTOS 1220 and the DRM application 1210 are called as a first virtual execution unit 1501, and the virtual machine 1231, the general-purpose OS 1221 and the DRM application 1211 are called as a second virtual execution unit 1502.

The following explains the content playback operations by the mobile terminal 1200, with reference to FIG. 11 to FIG. 15.

First, the RTOS 1220 and the general-purpose OS 1221 start up the DRM application 1210 and the playback application 1211 respectively (Step S2001 and Step S2003).

The DRM application 1210 outputs an area reservation request to the shared-data management unit 1243 of the virtual machine monitor 1240 via the RTOS 1220 and the virtual machine 1230 (Step S2002).

In the same manner, the playback application 1211 outputs an area reservation request to the virtual machine monitor 1240 via the general-purpose OS 1221 and the virtual machine 1231 (Step S2004).

The shared-data reservation unit 1260 in the virtual machine monitor 1240 receives the area reservation requests from the first virtual execution unit 1501 and the second virtual execution unit 1502 and reserve the shared-data area 1255 on the memory 1251 (Step S2006).

The shared-data reservation unit 1260 generates an area identifier corresponding to the shared-data area 1255 (Step S2007), and outputs the generated area identifier to the first virtual execution unit 1501 and the second virtual execution unit 1502 (Step S2008 and Step S2009).

The playback application 1211 in the second virtual execution unit 1502 acquires the area identifier via the virtual machine 1231 and the general-purpose OS 1221 (Step S2008), and the DRM application 1210 in the first virtual execution unit 1501 acquires the area identifier via the virtual machine 1230 and the RTOS 1220 (Step S2009).

Next, the playback application 1211 receives key operations for playback of the content from the user (Step S2012). The playback application 1211 outputs the content identifier indicating the content designated by the user's key operation and the rights information acquisition request that includes the area identifier received from the virtual machine monitor 1240 to the virtual machine monitor 1240 (Step S2013).

The virtual machine monitor 1240 receives the rights information acquisition request from the from the playback application 1211 in the second virtual execution unit 1502 (Step S2013). Upon receipt of the rights information acquisition request, the virtual machine monitor 1240 makes a judgment on the timing of notifying the first virtual execution unit 1501 about the received rights information acquisition request (Step S2016). This judgment is explained later. Here, since the virtual machine 1230 of the first virtual execution unit 1501 is in the normal state, the virtual machine monitor 1240 judges in Step S2016 that the notification should be performed immediately. The virtual machine monitor 1240 outputs the rights information acquisition request to the first virtual execution unit 1501 (Step S2017).

The DRM application 1210 receives the rights information acquisition request via the virtual machine 1230 and the RTOS 1220 (Step S2017), and acquires the rights information corresponding to the content identifier included in the received rights information acquisition request, from the rights management server 1100 (Step S2018). Next, the DRM application 1210 outputs a data change request that includes the acquired rights information and the area identifier, to the virtual machine monitor 1240 via the RTOS 1220 and the virtual machine 1230 (Step S2021).

The shared-data changing unit 1261 of the virtual machine monitor 1240 receives the data change request from the first virtual execution unit 1501 (Step S2021), and changes the rights information in the shared-data area 1255 indicated by the area identifier included in the received data change request, using the rights information included in the data change request (Step S2022).

After the rights information is changed, the data change notification unit 1263 outputs a data change notification request to the inter-VM notification management unit 1242 (Step S2023). The inter-VM notification management unit 1242 starts making a judgment on the timing of notifying the data change (Step S2026). Here, since the virtual machine 1231 of the second virtual execution unit 1502 is in the normal state, the inter-VM monitor notification management unit 1242 judges that the notification should be performed immediately. The virtual machine monitor 1240 outputs the data change notification to the second virtual execution unit 1502 (Step S2027).

The playback application 1211 receives the data change notification via the virtual machine 1231 and the general-purpose OS 1221 (Step S2027). Next, the playback application 1211 reads the rights information stored in the shared-data area 1255 indicated by the area identifier included in the data change notification, and determines the playback stop time and the timer setting time based on the read sights information (Step S2034). The playback application 1211 sets the determined timer setting time to the timer 1254 (Step S2036). Next, the playback application 1211 outputs the area identifier that indicates the shared-data area 1255 corresponding to the content to be played back according to the instruction and the notification timing information change request that includes the notification timing information "B", to the virtual machine monitor 1240 via the general-purpose OS 1221 and the virtual machine 1231 (Step S2037).

Next, the playback application 1211 instructs the decoder and the playback mechanism included in the hardware 1250 to play back the content (Step S2041).

According to the instruction from the playback application 1211, the decoder and the playback mechanism starts the decoding and the playback of the content (Step S2042).

After making the instruction, the playback application 1211 enters into the idle state (Step S2044).

As the playback application 1211 enters into the idle state, the virtual machine 1231 enters into the power-saving state (Step S2046).

The shared-data management unit 1243 in the virtual machine monitor 1240 receives a notification timing information change request from the second virtual execution unit 1502 (Step S2037). The shared-data management unit 1243 changes the notification timing information that is included in the management information 1410 corresponding to the area identifier included in the received notification timing information change request, and corresponds to the playback application 1211 (Step S2038).

A prescribed period after outputting the data change request in Step S2021, the DRM application 1210 enters into the idle state (Step S2031).

As the DRM application 1210 enters into the idle state, the virtual machine 1230 enters into the power-saving state (Step S2032).

When both the first virtual execution unit 1501 and the second virtual execution unit 1502 have enter into the power-saving state, the mobile terminal 1200 itself enters into the idle state (Step S2048), and waits until any interruption occurs. In the meanwhile, the decoder and the playback mechanism continue the playback of the content.

When an interruption is caused by the user's key operation for instructing the acquisition of the rights information (Step S2049), the virtual machine 1230 and the DRM application 1210, included in the first virtual execution unit 1501, return to the normal state (Step S2051).

The DRM application 1210 acquires new rights information relating to the content being played back from the rights management server 1100, according to the instruction by the key operation (Step S2052). Subsequently, the DRM application 1210 generates a data change request that includes the acquired rights information and the area identifier indicating the shared-data area 1255, and outputs the generated data change request to the virtual machine monitor 1240 via the RTOS 1220 and the virtual machine 1230 (Step S2054).

The shared-data changing unit 1261 in the virtual machine monitor 1240 receives the data change request from the first virtual execution unit 1501 (Step S2054), and changes the rights information stored in the shared-data area 1255, according to the received data change request (Step S2056)

After the rights information is changed, the data change notification unit 1263 outputs the data change notification request to the inter-VM notification management unit 1242 (Step S2057).

Upon receipt of the data change notification request, the inter-VM notification management unit 1242 starts making a judgment on the timing of outputting the data change notification (Step S2058).

The virtual machine monitor 1240 outputs the data change notification to the second virtual execution unit according to the judgment result of Step S2058 (Step S2059).

When an interruption by the timer 1254, an interruption by the virtual machine monitor 1240 or an interruption by the key-in by the user occurs (Step S2062), the virtual machine 1231 and the playback application 1211, included in the second virtual execution unit 1502, return to the normal state (Step S2063).

After returning to the normal state, if the second virtual execution unit 1502 has not received the data change notification from the virtual machine monitor 1240 (NO in Step S2064) and if the current time has not reach the playback stop time determined in the step S2034 (NO in Step S2066), the second virtual execution unit 1502 waits until reception of the data change notification or the current time reaches the playback stop time.

Before receiving the data change notification (NO in Step S2064), if the current time reaches the playback stop time (Step S2066), the playback application 1211 instructs the decoder to stop the playback of the content (Step S2067).

Upon receipt of this instruction, the decoder and the playback mechanism stop the playback of the content.

Upon receipt of the data change notification (YES in Step S2064), the playback application 1211 refers to the changed rights information stored in the shared-data area 1255, and determines a new playback stop time (Step S2069). At this moment, if the content is being played back (YES in Step S2071), the playback application 1211 continues the playback until the new playback stop time.

If the content has been stopped (NO in Step S2071), the playback application 1211 instructs the decoder to restart the playback (Step S2072).

If the request for additional acquisition of the rights information being played back does not occur in Step S2049, the operations of the second virtual execution unit 1502 after the Step S2062 are different. If this is the case, a timer interruption occurs in Step S2062. If the current time reaches the playback stop time in Step S2066 (YES in Step S2066), the playback application 1211 instructs the decoder to stop the playback (Step S2067), and the mobile terminal 1200 stops the content playback operations.

(2) Operations for Notification Judgment by the Virtual Machine Monitor 1240

The inter-VM notification management unit 1242 receives a data change notification request from the data change notification unit 1263. Also, the inter-VM notification management unit 1242 is requested to mediate the various instructions and requests from any one of the first virtual execution unit and the second virtual execution unit. In this regard, the virtual machine monitor 1240 makes a judgment on the timing of notification of the request (hereinafter called the notification judgment), and the inter-VM notification management unit 1242 makes a notification of the request according to the timing determined as a result of the judgment.

Figure 16:
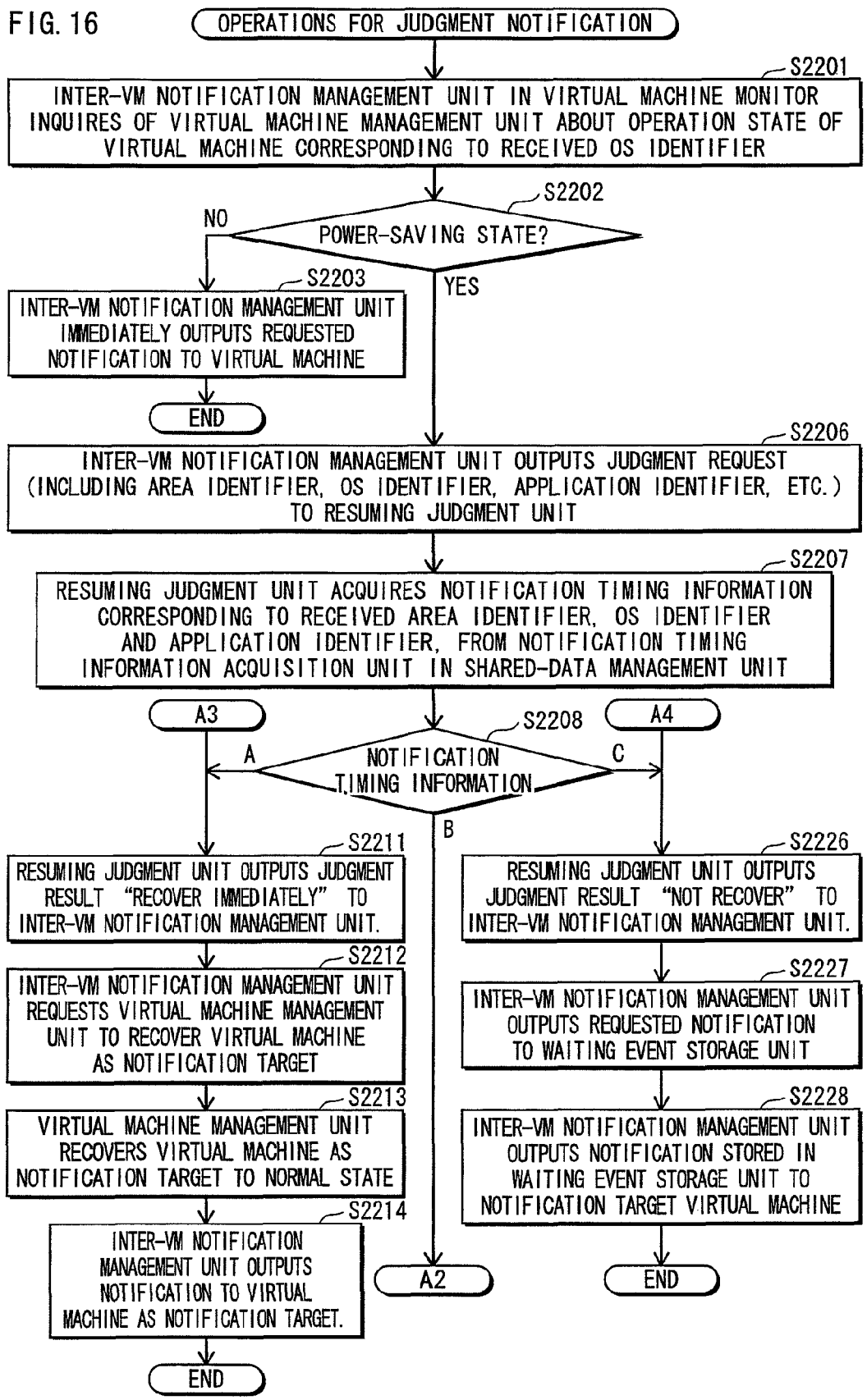
FIG. 16 is a flowchart showing operations for notification judgment performed by the virtual machine monitor 1240 pertaining to the first embodiment of the present invention.
Figure 17:
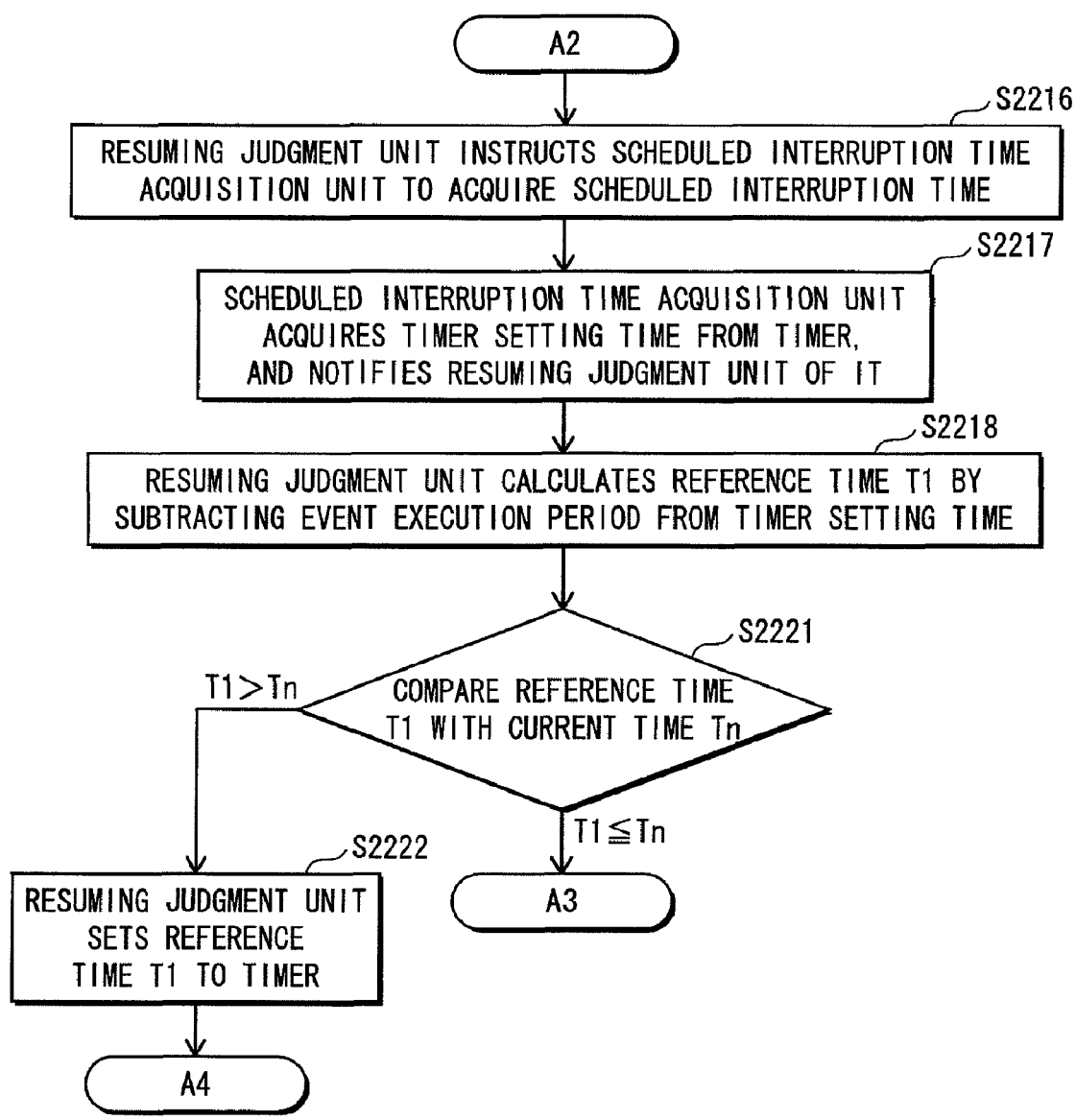
FIG. 17 is a flowchart showing operations for the notification judgment performed by the virtual machine monitor 1240 pertaining to the first embodiment of the present invention, continued from FIG. 16.

FIG. 16 and FIG. 17 are flowcharts showing operations for the notification judgment performed by the virtual machine monitor. These flowcharts show the details of Steps S2016 and S2026 in FIG. 12 and Step S2058 in FIG. 15

The following explains the operations for the notification judgment, with reference to FIG. 16 and FIG. 17. Here, the request that the inter-VM notification management unit 1242 receives includes the OS identifier and the application identifier that respectively indicate the OS and the application included in the virtual execution unit as the notification target, and the area identifier that indicates the shared-data area relating to the notification.

The inter-VM notification management unit 1242 inquires of the virtual machine management unit 1241 about the operation state of the virtual machine corresponding to the received OS identifier (Step S2201).

As a result of the inquiry, if the virtual machine is not in the power-saving state (NO in Step S2202), the inter-VM notification management unit 1242 immediately outputs the requested notification to the virtual machine as the notification target (Step S2203).

If the virtual machine is in the power-saving state (YES in Step S2202), the inter-VM notification management unit 1242 outputs the judgment request, including the received area identifier, OS identifier and application identifier, to the resuming judgment unit 1244 (Step S2206).

The resuming judgment unit 1244 acquires the notification timing information corresponding to the received area identifier, OS identifier and application identifier, from the notification timing information acquisition unit 1264 in the shared-data management unit 1243 (Step S2207).

If the acquired notification timing information indicates "A: To be notified immediately" (A in Step S2208), the resuming judgment unit 1244 outputs a judgment result "Recover immediately" (Step S2211).

The inter-VM notification management unit 1242 receives the judgment result "Recover immediately", and requests the virtual machine management unit 1241 to recover the virtual machine as the notification target (Step S2212).

The virtual machine management unit 1241 causes an interruption and recover the notification target virtual machine to the normal state (Step S2213).

Immediately after the notification target virtual machine returns to the normal state, the inter-VM notification management unit 1242 outputs the notification to the virtual machine (Step S2214).

If the acquired notification timing information indicates "C: To be notified when returning from the power-saving state" (C in Step S2208), the resuming judgment unit 1244 outputs a judgment result "Not recover" (Step S2226).

The inter-VM notification management unit 1242 receives the judgment result "Not recover", and outputs the requested notification to the waiting event storage unit 1246 (Step S2227). When the notification target virtual machine returns to the normal state due to occurrence of an interruption, the inter-VM notification management unit 1242 outputs the notification stored in the waiting event storage unit 1246 to the notification target virtual machine (Step S2228).

If the acquired notification timing information indicates "B: To be notified within a prescribed period" (B in Step S2208), the resuming judgment unit 1244 instructs the scheduled interruption time acquisition unit 1245 to acquire the scheduled interruption time (Step S2216).

Next, the scheduled interruption time acquisition unit 1245 acquires the timer setting time from the timer 1254, and notifies the resuming judgment unit 1244 of the acquired timer setting time as the scheduled interruption time (Step S2217).

The resuming judgment unit 1244 calculates the reference time T1 by subtracting the event execution period t1 from the timer setting time (Step S2218). Then, the resuming judgment unit 1244 compares the reference time T1 with the current time Tn (Step S2221).

As a result of the comparison, if T1>Tn (T1>Tn in Step S2221), the resuming judgment unit 1244 sets the reference time T1 to the timer 1254 (Step S2222), and moves to Step S2226.

As a result of the comparison, if T1≦Tn (T1≦T2 in Step S2221), the resuming judgment unit 1244 moves to Step S2211.

2.6 Summary

According the first embodiment described above, it is possible to realize a mobile terminal 1200 that includes the inter- VM notification management unit 1242 that can reduce the count of recoveries from the power-saving state to the normal state to realize the power saving of the device, and make the event notification at appropriate timings. For this purpose, the inter-VM notification management unit 1242 determines whether to make the event notification according to the judgment on whether to recover the virtual machine from the power-saving state to the normal state.

In the first embodiment, if the reference time T1>the current time Tn, the reference time T1 is set to the timer 1254. However, any time can be set to the timer 1254 as long as the time is before the reference time T1.

During the playback of the content, that is, while the second virtual execution unit 1502 is in the power-saving state, the first virtual execution unit 1501 acquires the rights information according to the user's operation, and the virtual machine monitor 1240 notifies the second virtual execution unit 1502 about the change to the rights information at the timing determined based on the notification timing information corresponding to the playback application. However, while the second virtual execution unit 1502 is in the power-saving state, even if any event like changing of the rights information does not occur, the virtual machine monitor 1240 may notify the second virtual execution unit 1502 about that no event has occurred, when the second virtual execution unit 1502 returns to the normal state.

In the case described above, t1'<t1 is satisfied, where t1' is the event execution time required for the notification about that no event has occurred, and the event execution time t1 includes a time required for changing the rights information via the virtual machine 1231 and also includes a time required for the playback application 1211 to refer to the changed rights information.

Accordingly, T1<T1' is satisfied, where T1 is the reference time of the case where the data change has occurred, and T1' is the reference time where the data change has not occurred.

Also, in the first embodiment, upon receipt of the data change request from the first virtual execution unit 1501, the shared-data changing unit 1261 outputs the change notification request to the data change notification unit 1263, and the data change notification unit 1263 outputs the data change notification request to the inter-VM notification management unit 1242. However, it is possible that the data change notification unit 1263 is monitoring the shared-data area 1255 to check any changes to the stored data, and outputs the data change notification request to the inter-VM notification management unit 1242 when the stored data has been changed.

In the first embodiment, it is assumed that the rights information includes the restriction information relating to the playback of the content. However, the rights information may include part or all of the content. If this is the case, during the playback of the content that has been already acquired, the DRM application acquires the rights information that includes the succeeding part of the content that is being played back.

Also, in the embodiment above, although the resuming judgment unit 1244 obtains the judgment result by comparing the current time and the reference time, the way to obtain the result is not limited to this. For example, the resuming judgment unit 1244 may calculate the length of the period from the current time to the time setting time (scheduled power-saving period t3) and compares the scheduled power-saving period t3 with the event execution time t1. If this is the case, if t3≦t1, the resuming judgment unit 1244 outputs the judgment result "Recover immediately". If t3>t1, the resuming judgment unit 1244 outputs the judgment result "Not recover" and sets the reference time T1 or a time T1-α, which is a before the reference time T1, to the timer 1254.

3. The Second Embodiment

As the second embedment, the following explains an example of application of the present invention to a mobile terminal that supports the TCG.

3.1 TCG

TCG (Trusted Computing Group) is an industry group that aims to realize a secure computing environment by ensuring the reliability of the platform.

The TCG uses Trusted Platform Module (TPM), which is a temper-resistant module, to realize a function called "Integrity Measurement". This function is used for calculating (measuring) a hash value of software (hereinafter called "the measurement result" or "the measurement value"), and securely storing the calculated hash value in Platform Configuration Register (PCR) in the TPM. When storing the hash value into the PCR, the TPM internally calculates a hash value for a combination of the PCR value at the moment and the hash value to be newly stored, and stores the calculation result as a new PCR value (This processing is also called as "reflect the calculation result to the PCR"). Using this function, it is possible to check whether the application software programs are started up in the appropriate order by sequentially checking the TPM, the BIOS, and OS and setting their respective hash values to the PCR one by one. As a result, it is possible to realize a reliable software execution environment.

Further, when performing the measurement for the BIOS, the TPM verifies whether the BIOS has been tampered with by checking whether the hash value as the measurement result is a prescribed value, and stops the start up of the BIOS if the BIOS has been tempered with. In the same manner. The BIOS performs the measurement and the verification of the OS, and if the OS has been tampered with, the BIOS stops the start up of the OS. In this way, it is also possible to establish a secure software execution environment in which unauthorized software can not operate, by performing the measurement (calculation of the hash value) and the verification.

Also, the function of the measurement and the verification of the software may be regularly performed during the execution of the program and before processing that handles codes and data that require protection within the software by a key or the like, as well as when the program is started up. As a result, it is possible to establish a software execution environment where it is possible to detect that the program has been tampered with, during the execution of the program, using a debugger or the like.

In addition to the function mentioned above, the TPM has a encryption/decryption function and hash calculation function as functions that can be used from the outside. These functions can be used for decryption of data encrypted by a device equipped with the TPM, detection of tampering of data using a hash.

3.2 The Structure of the Mobile Terminal 1200

Figure 18:
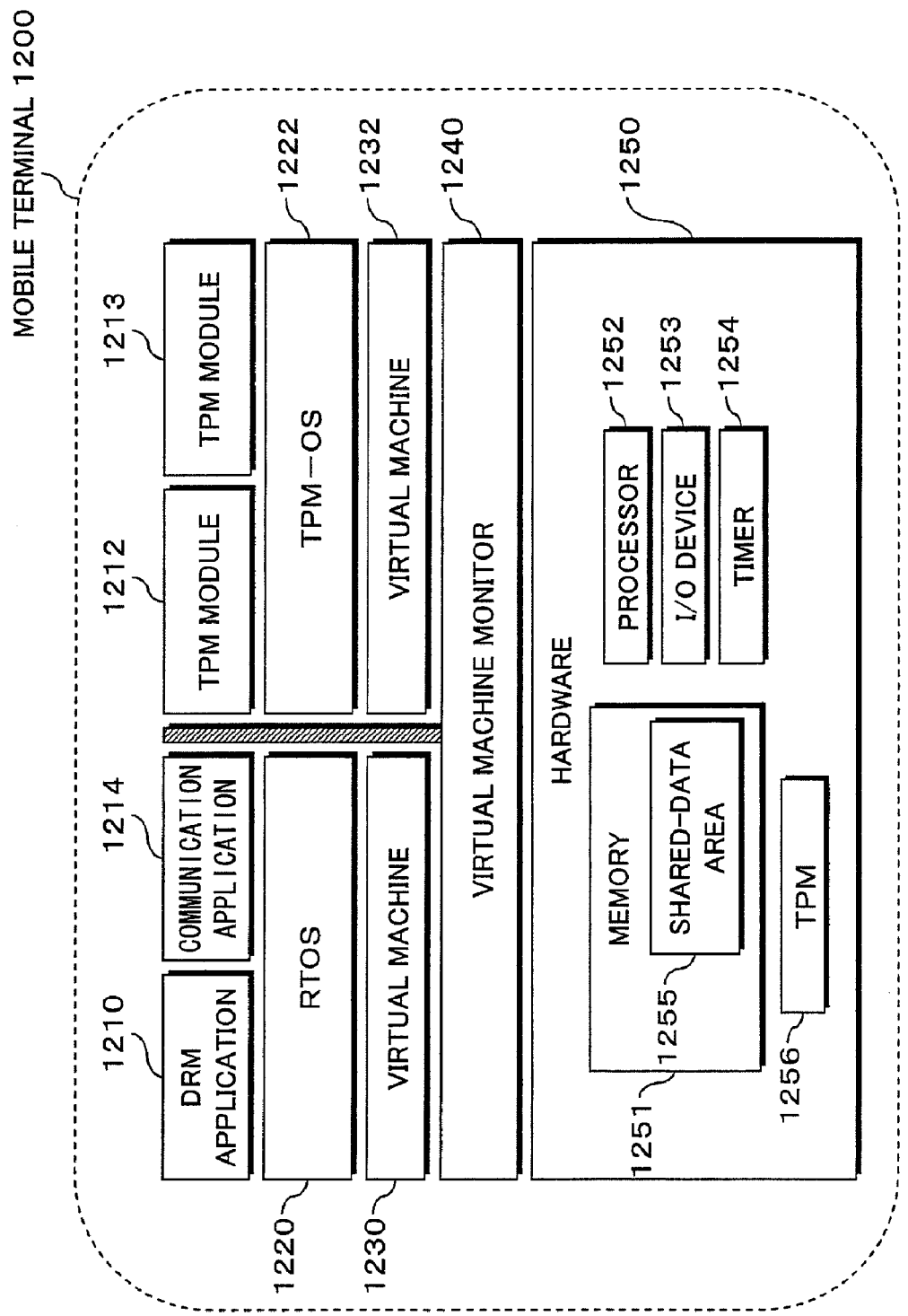
FIG. 18 shows the structure of the mobile terminal 1200 pertaining to a second embedment of the present invention.

FIG. 18 shows the structure of the mobile terminal 1200 pertaining to the second embodiment of the present invention. In FIG. 18, the same reference signs are given to the same components as those shown in FIG. 3, and their explanations are omitted here.

As FIG. 18 illustrates, the mobile terminal 1200 includes a TPM-OS 1222, a DRM application 1210, a communication application 1214, TPM modules 1212 and 1213 and a TPM 1256 as well as the components of FIG. 3.

The TPM-OS 1222 is an OS that runs on the virtual machine 1232. The TPM modules 1212 and 1213 are applications that run on the TPM-OS 1222.

The TPM 1256 is hardware module, and stores therein a program to run first in the boot sequence for starting up the mobile terminal 1200. The TPM modules 1212 and 1213 are applications that realize the functions of the TPM. They have different identifiers so that they operate as different TPMs. Since a plurality of TPM modules are running on the TPM-OS 1222, it is possible to use different TPMs depending on the manufacturer of the terminal device, the communication carrier, the copyrights management company and so on.

With the stated structure, each business operator can use its own TPM. For example, the TPM 1256, the TPM module 1212, and the TPM module 1213 may be used by the manufacturer of the terminal device, the communication carrier and the copy rights management company, respectively. Here, the TPM 1256 is used for verification and measurement of software required for operating the terminal, such as the virtual machine monitor 1240 and the TPM-OS 1222. The TPM module 1212 is used for verification and measurement of software required for communications, such as the RTOS 1220 and the communication application 1214 that run on the virtual machine 1230. The TPM module 1213 is used for verification and measurement of software that performs copyrights processing of contents, such as the DRM 1210.

In the second embodiment, to secure the reliability of all the TPMs (including the TPM modules), the TPM 1256 performs the verification and the measurement of the TPM module 1212, and the TPM module 1212 performs the verification and the measurement of the TPM module 1213. As a result, it is possible to realize the reliability of the TPM 1256 to the TPM module 1213, and use the plurality of TPMs while keeping the internal security of the mobile terminal 1200.

In the explanation above, the TPM modules 1212 and 1213 are realized as application software. However, the structure of the present invention is not limited to this. Some of the functions of the TPM, such as the encryption and decryption function and the hash calculation function which can be shared between the TPMs, may be realized as hardware. Further, the TPM 1256 may have a structure for switching among a plurality of contexts. If this is the case, the TPM modules 1212 and 1213 may provide only interfaces to the applications that use the TPMs, and The TPM 1256 perform the actual processing.

The DRM application 1210 is an application that has the same functions as those of the DRM application 1210 of the first embodiment. However, in this embodiment, the TPM module 1213 (i.e. the TPM module for the copyrights management company) is started up first and starts its processing. The DRM application 1210 generates a processing event for the TPM module 1213 when encryption or decryption of data is required during the operation, and requests the TPM module 1213 to perform the processing, via the inter-VM notification management unit 1242 of the virtual machine monitor 1240.

The communication application 1214 is an application that handles communications between the mobile terminal 1200 and the outside. The communication application 1214 is started up by the RTOS 1220, and the TPM module 1212 (i.e. the TPM module for the communication carrier) performs the verification and the measurement on the communication application 1214. The communication application 1214 generates a processing event for the TPM module 1212 when encryption or decryption of data is required during the operation, and requests the TPM module 1212 to perform the processing, via the inter-VM notification management unit 1242 of the virtual machine monitor 1240.

The TPM-OS 1222 is an OS that provides the TPM module 1212 and the TPM module 1213 with the execution environment. While the TPM module 1212 and the TPM module 1213 are not operating, the TPM-OS 1222 puts the virtual machine 1232 into the power saving state. Also, when it becomes necessary for the virtual machine 1232 to restart operations, such as when a processing request is issued from the DRM application 1210 or the communication application 1214, the TPM-OS 1222 recovers from the power-saving state.

Figure 19:
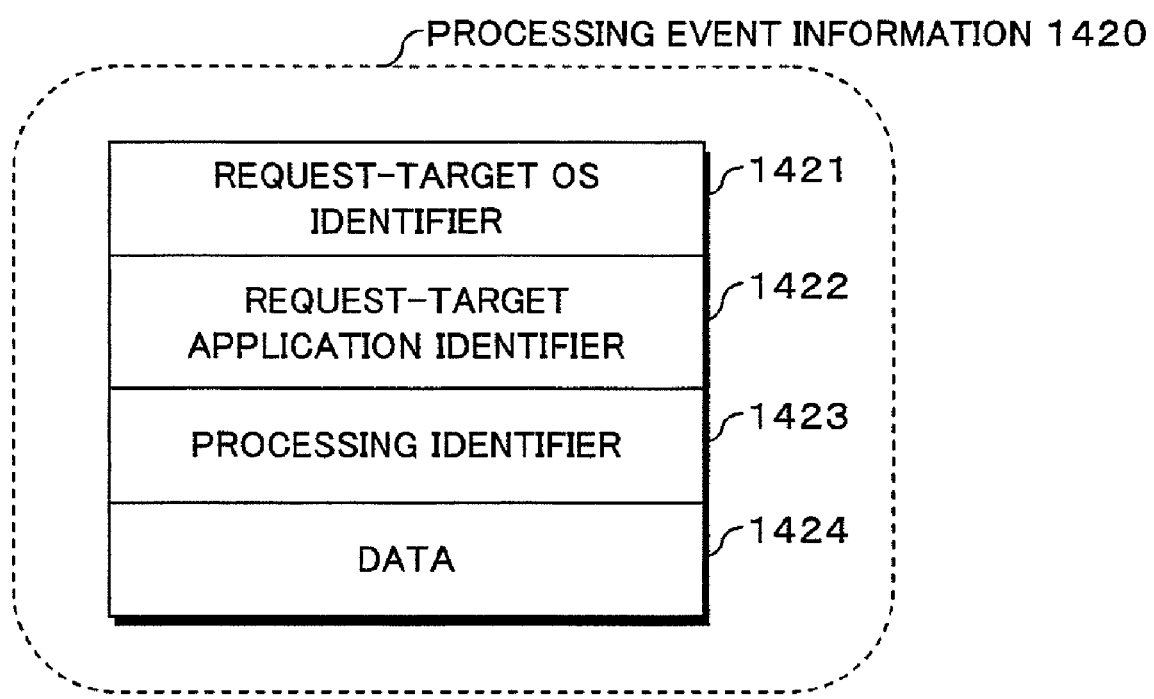
FIG. 19 shows the structure processing event information 1420 pertaining to the second embodiment of the present invention.
Figure 20:
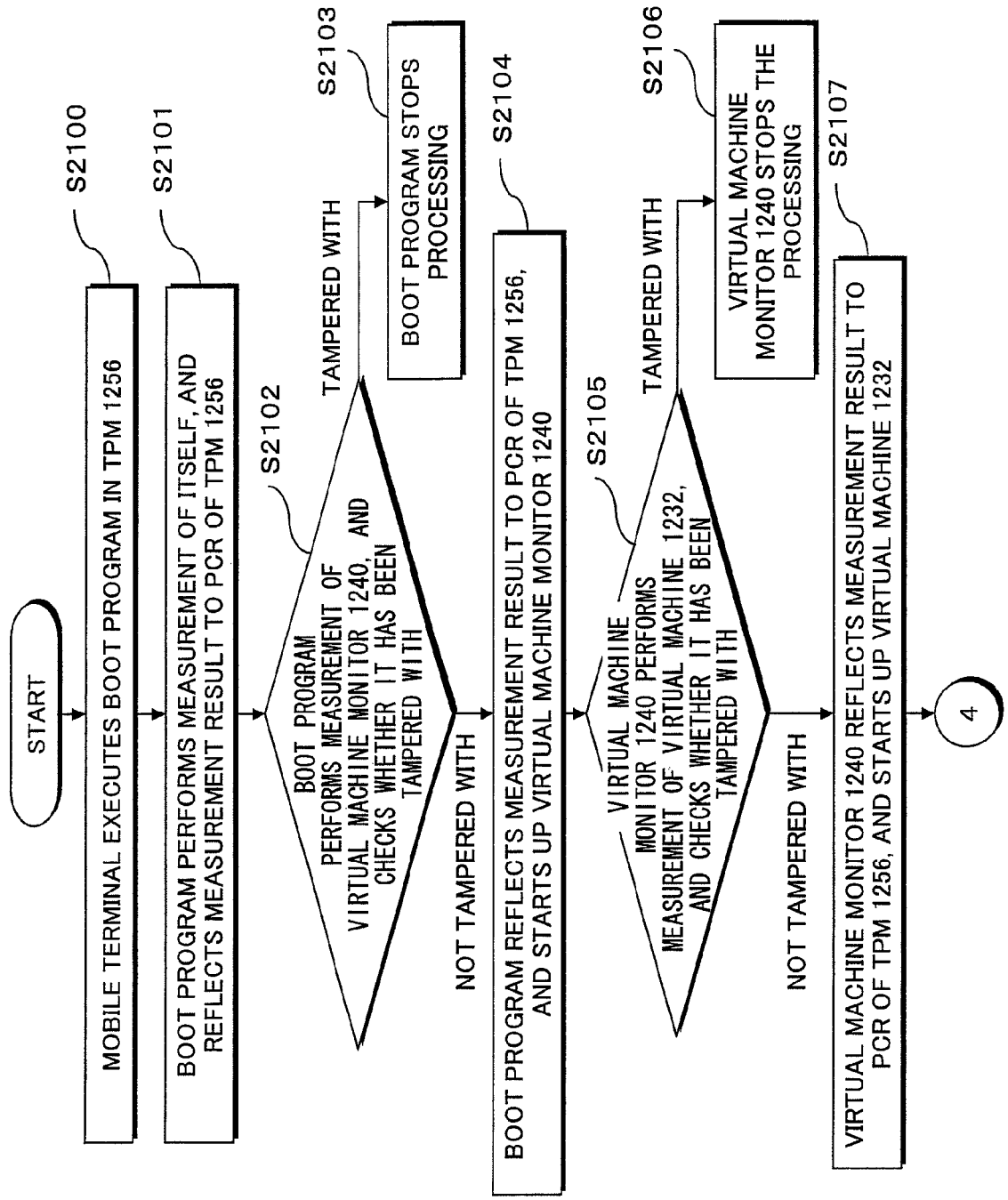
FIG. 20 is a flowchart showing start-up operations performed by the mobile terminal 1200 pertaining to the second embodiment of the present invention.
Figure 21:
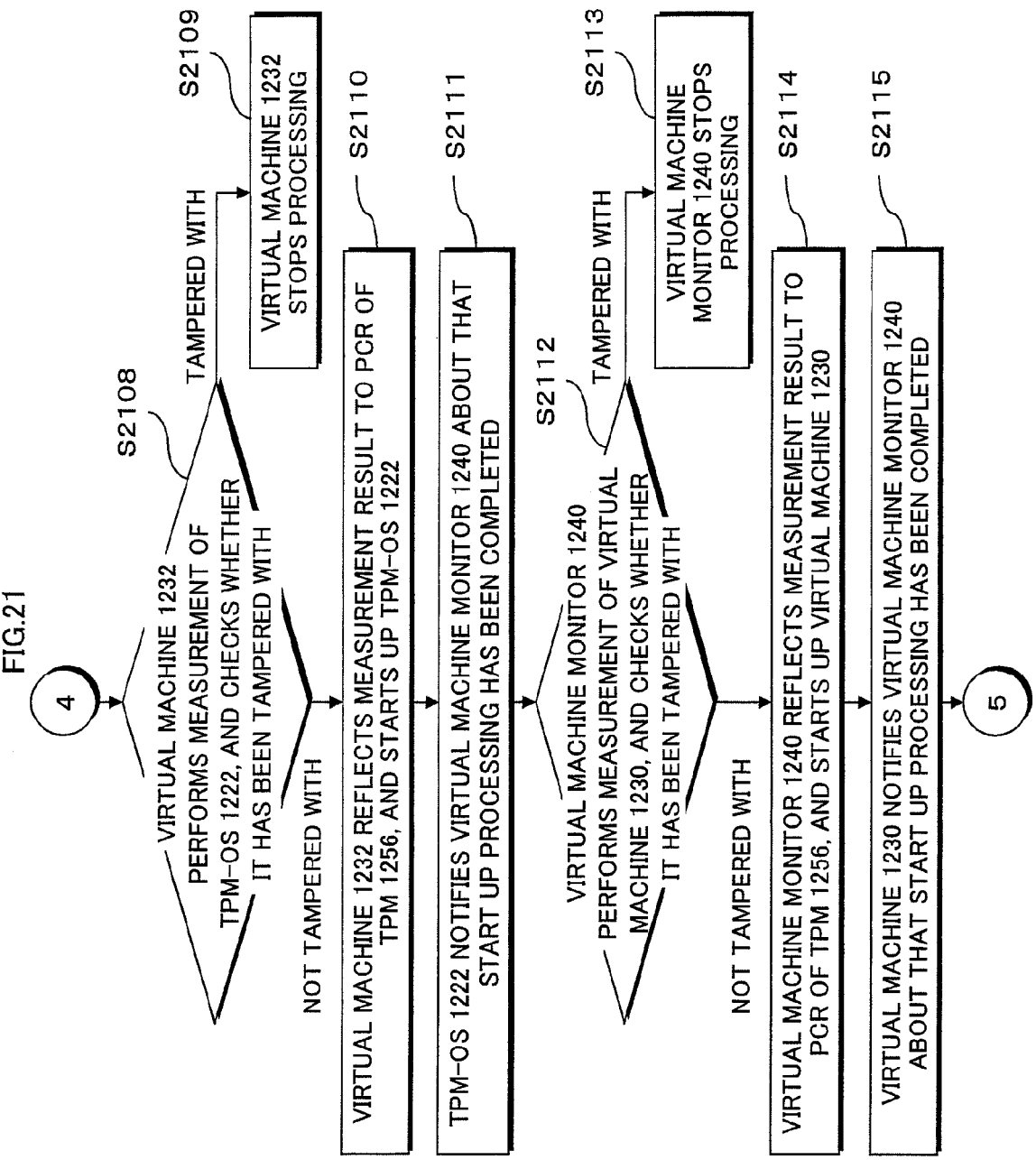
FIG. 21 is a flowchart showing start-up operations performed by the mobile terminal 1200 pertaining to the second embodiment of the present invention, continued from FIG. 20.
Figure 22:
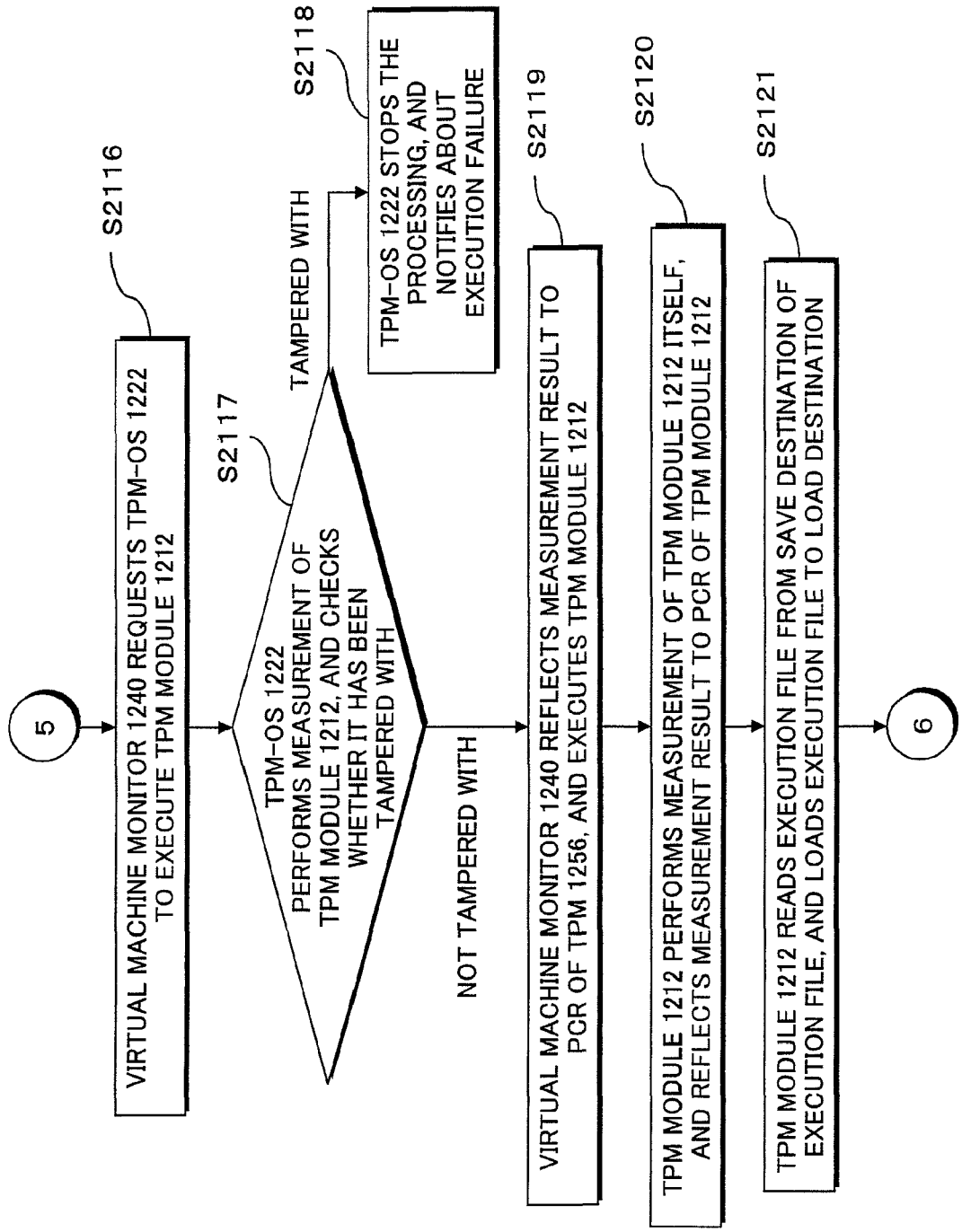
FIG. 22 is a flowchart showing start-up operations performed by the mobile terminal 1200 pertaining to the second embodiment of the present invention, continued from FIG. 21.
Figure 23:
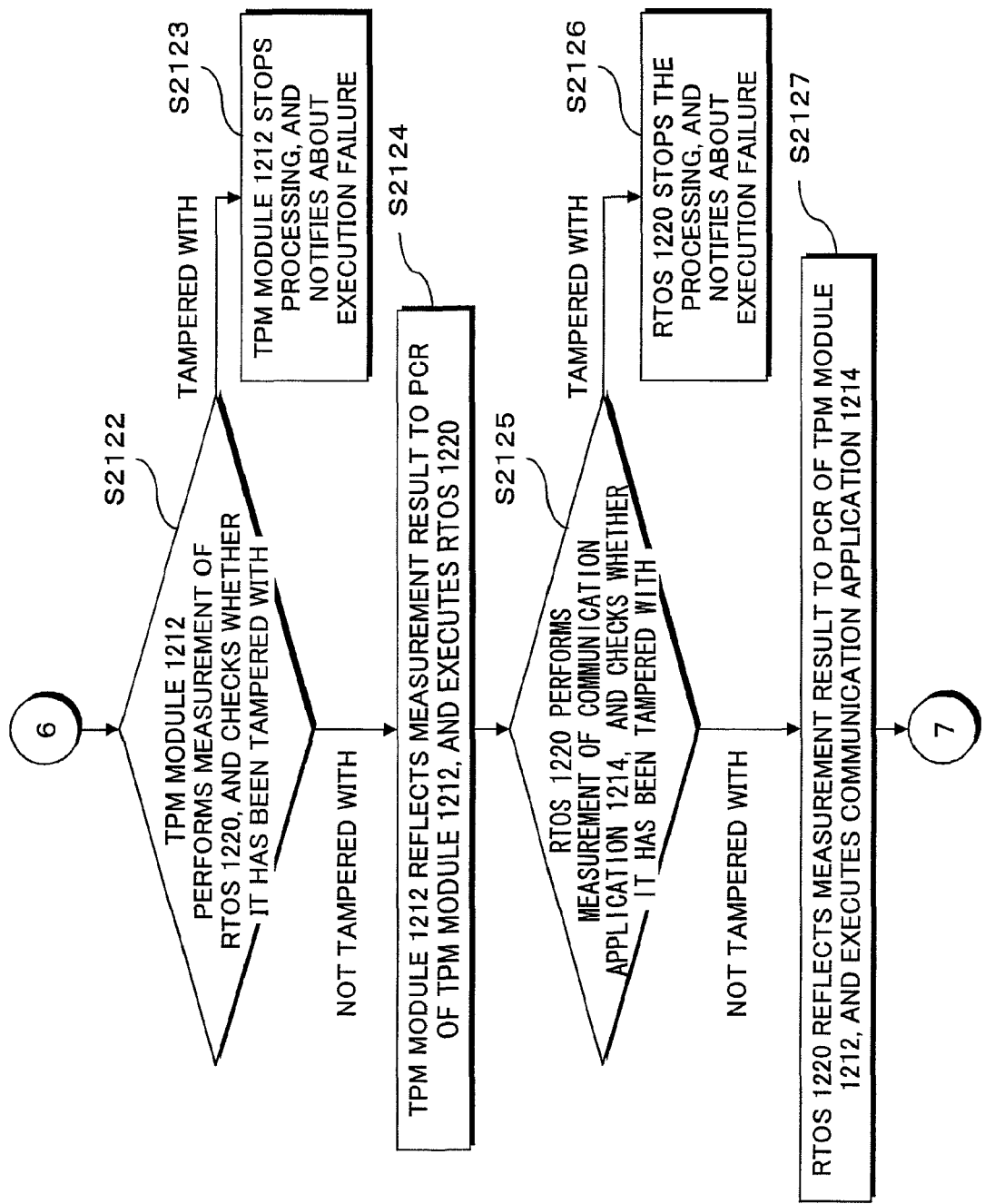
FIG. 23 is a flowchart showing start-up operations performed by the mobile terminal 1200 pertaining to the second embodiment of the present invention, continued from FIG. 22.
Figure 24:
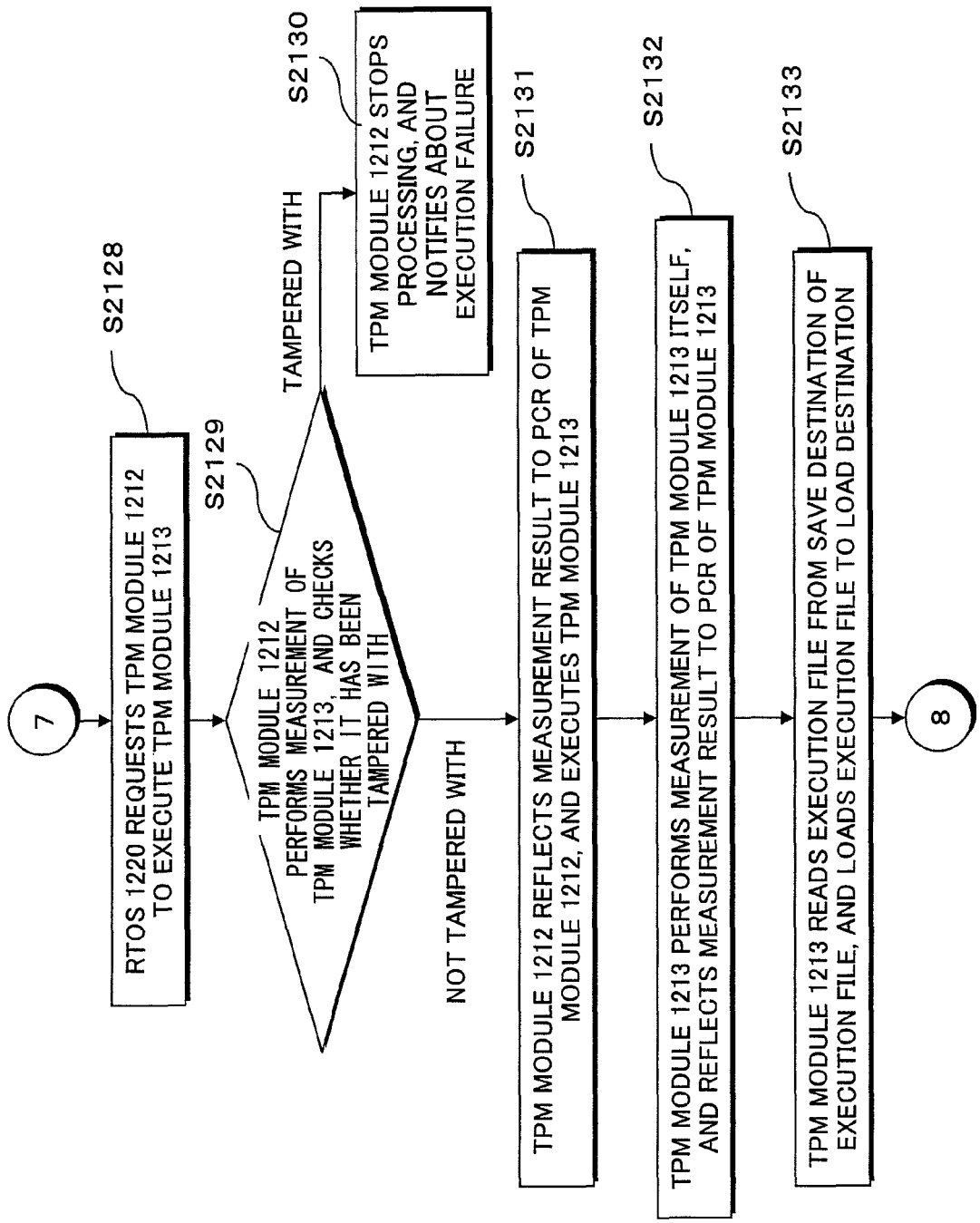
FIG. 24 is a flowchart showing start-up operations performed by the mobile terminal 1200 pertaining to the second embodiment of the present invention, continued from FIG. 23.
Figure 25:
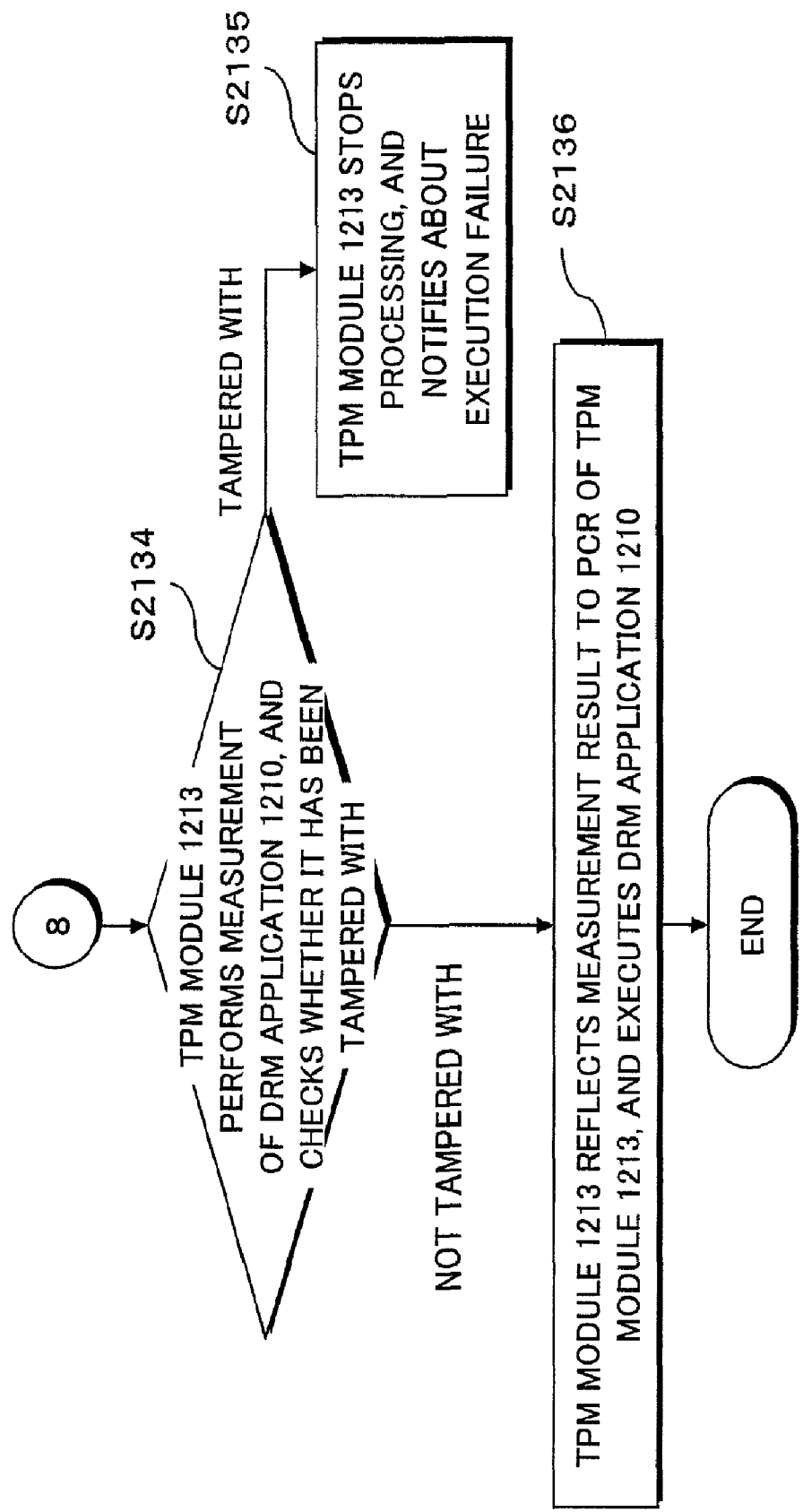
FIG. 25 is a flowchart showing start-up operations performed by the mobile terminal 1200 pertaining to the second embodiment of the present invention, continued from FIG. 24.
Figure 27:
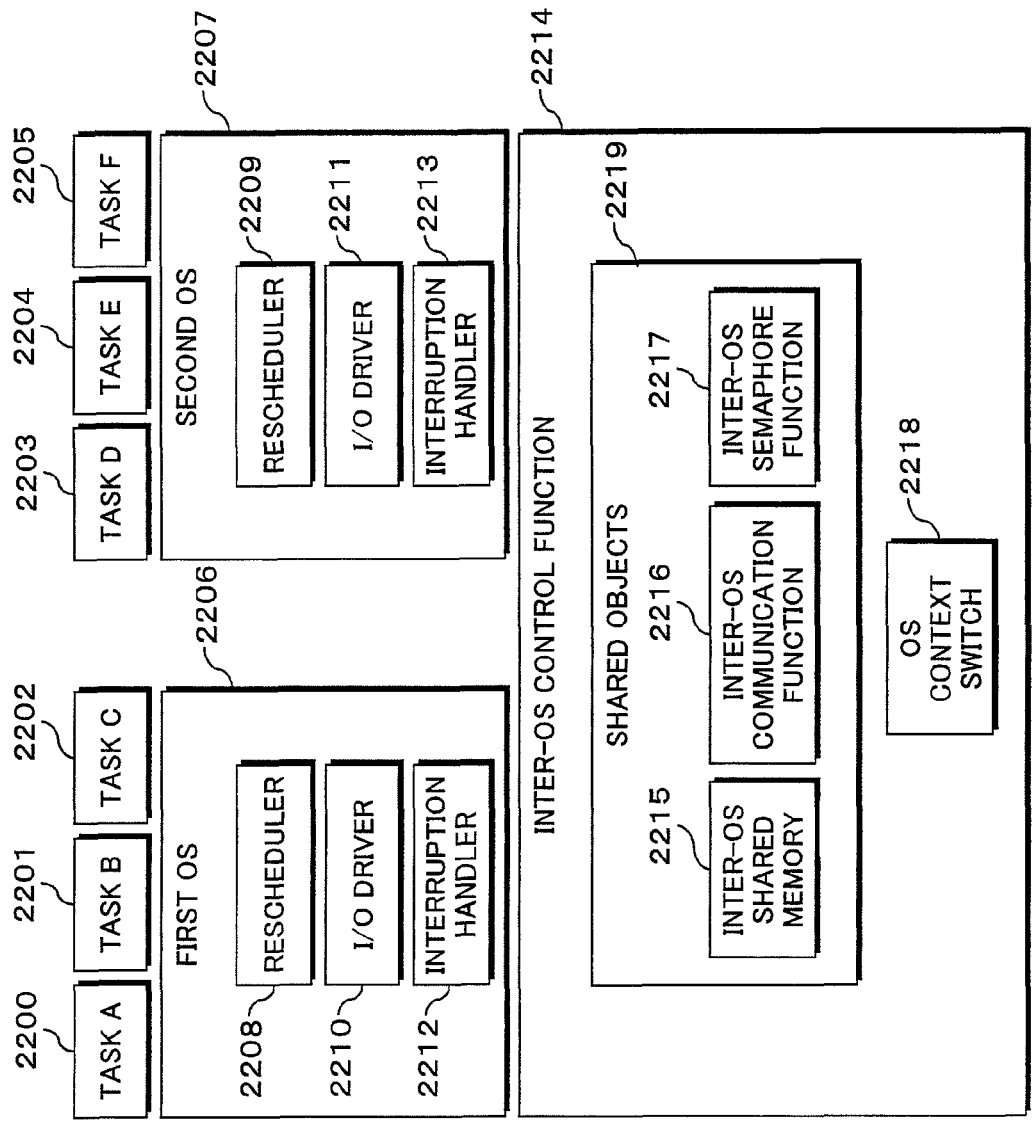
FIG. 27 shows the structure of a shared-data change notification function pertaining to a conventional art.

Next, the details of the processing event in the second embodiment are explained. FIG. 19 shows the data structure of the processing event pertaining to the second embodiment. Note that the structures of the event for the TPM module 1212 and that for the TPM module 1213 are the same.

As FIG. 19 shows, processing event information 1420 includes a request-target OS identifier 1421 for identifying the OS on which the application as the request target is running, a request-target application identifier 1422 for identifying the application as the request target, a processing identifier 1423 for identifying requested processing, and data 1424 required for the processing. The request-target OS identifier 1421 is used for identifying the OS running on the virtual machine monitor 1240. For example, an ID number or a name (e.g. "1" or "TPM-OS") can be used as the request-target OS identifier 1421. The request-target application identifier 1422 is used for identifying the application running on the OS. For example, an ID number or a name (e.g. "1212" or "TPM module 1") can be used as the request-target application identifier 1422.

When requesting the TPM module 1212 or the TPM module 1213 to perform processing, the DRM application 1210 or the communication application 1214 generates the processing event information 1420, and requests the inter-VM notification unit 1242 of the virtual machine monitor 1240 to make a notification of the event. The request-target OS identifier 1421 and the request-target application identifier 1422 corresponding to the TPM modules 1212 and 1213, required for the generation of the processing event information 1420, are acquired from the setting file when the DRM application 1210 or the communication application 1214 is started up. Upon receipt of the request for the notification of the processing event information 1420, the inter-VM notification management unit 1242 makes a notification of the event according to the request-target OS identifier 1421 and the request-target application identifier 1422 included in the processing event information 1420.

While the TPM modules 1212 and 1213 are not operating, the TPM-OS 1222 puts the virtual machine 1232 into the power-saving state. If the TPM modules 1212 and 1213 receive a processing request from the DRM application 1210 or the communication application 1214 while the virtual machine 1232 is in the power-saving state, the inter-VM notification management unit 1242 requests the resuming judgment unit 1244 to judge whether to recover the virtual machine 1232 from the power-saving state to the normal state. If the resuming judgment unit 1244 judges to recover the virtual machine 1232 from the power-saving state to the normal state, the inter-VM notification management unit 1242 requests the virtual machine management unit 1241 to recover the virtual machine 1232 from the power-saving state to the normal state. Upon receipt of this request, the inter-VM notification management unit 1242 outputs the processing event information 1420 to the virtual machine 1232 when the virtual machine 1232 returns to the normal state. On the other hand, if the resuming judgment unit 1244 judges not to recover the virtual machine 1232 from the power-saving state to the normal state, the inter-VM notification management unit 1242 stores the processing event information 1420 in the waiting event storage unit 1246, and outputs the processing event information 1420 to the virtual machine 1232 when the virtual machine 1232 recovers from the power-saving state to the normal state due to other factors.

3.3 The Boot Sequence of the Mobile Terminal 1200

FIG. 20 to FIG. 25 show the boot sequence of the mobile terminal 1200. The following explains the boot processing procedures from the power-on, one by one.

When powered on, the mobile terminal 1200 executes the boot program in the TPM 1256 (S2100). The boot program performs the measurement of itself, and reflects the measurement result to the PCR of the TPM 1256 (S2101). The boot program performs the measurement of the virtual machine monitor 1240, and checks whether the virtual machine monitor 1240 has been tampered with (S2102). If the virtual machine monitor 1240 has been tampered with, the boot program stops the processing (S2103). If not, the boot program reflects the measurement result to the PCR of the TPM 1256, and starts up the virtual machine monitor 1240 (S2104). Using the TPM 1256, the virtual machine monitor 1240 performs the measurement of the virtual machine 1232, and checks whether the virtual machine 1232 has been tampered with (S2105). If the virtual machine 1232 has been tampered with, the virtual machine monitor 1240 stops the processing (S2106). If not, the virtual machine monitor 1240 reflects the measurement result to the PCR of the TPM 1256, and starts up the virtual machine 1232 (S2107). The virtual machine 1232 executes the virtualized BIOS. Using the TPM 1256, the virtual machine 1232 performs the measurement of the TPM-OS 1222, and checks whether the TPM-OS 1222 has been tampered with (S2108). If the TPM-OS 1222 has been tampered with, the virtual machine 1232 stops the processing (S2109). If not, the virtual machine 1232 reflects the measurement result to the PCR of the TPM 1256, and starts up the TPM-OS 1222 (S2110). When the start-up operations complete and the TPM module is ready to operate, the TPM-OS 1222 notifies the virtual machine monitor 1240 about that (S2111). At this moment, the virtual machine 1230 is ready to operate.

Next, using the TPM 1256, the virtual machine monitor 1240 performs the measurement of the virtual machine 1230, and checks whether the virtual machine 1230 has been tampered with (S2112). If the virtual machine 1230 has been tampered with, the virtual machine monitor 1240 stops the processing (S2113). If not, the virtual machine monitor 1240 reflects the measurement result to the PCR of the TPM 1256, and starts up the virtual machine 1230 (S2114). The virtual machine executes the virtualized BIOS, and when the virtual machine 1230 is ready to operate on the OS, notifies the virtual machine monitor 1240 about that (S2115). At this moment, the RTOS 1220 is ready to operate. It is sufficient for the manufacturer of the mobile terminal 1200 to ensure the security at this level.

Next, the following explains operations performed by the communication carrier to ensure the security of the applications to be used for communications, such as the RTOS 1220 and the communication application 1214. As described above, to start up, the RTOS 1220 and the communication application 1214 use the TPM module 1212, which is a TPM module for a communication carrier but different from the TPM 1256.

To ensure the security, it is necessary to firstly start up the TPM module 1212 for the communication carrier. Accordingly, the virtual machine monitor 1240 requests the TPM-OS 1222 to execute the TPM module 1212 (S2116). When making the request, the virtual machine monitor 1240 notifies the TPM-OS 1222 about the save destination and the load destination of the execution file of the RTOS 1220 and instructs the TPM-OS 1222 to use the TPM 1256 to perform the measurement of the TPM module 1212. Here, it has been already confirmed that the TPM 1256 has not been tampered with. Therefore, with use of the TMP 1256, it is possible to perform the measurement of the TPM module 1212 under a reliable environment. Using the TPM 1256, the TPM-OS 1222 performs the measurement of the TPM module 1212 and checks whether the TPM module 1212 has been tampered with (S2117). If the TPM module 1212 has been tampered with, the TPM-OS 1222 stops the processing, and notifies the virtual machine monitor 1240 about the execution failure (S2118). If not, the virtual machine monitor 1240 reflects the measurement result to the PCR of the TPM 1256, and executes the TPM module 1212 with use of arguments, which are the save destination and the load destination of the execution file of the RTOS 1220 notified by the virtual machine monitor 1240 (S2119). The TPM module 1212 performs the measurement of the TPM module 1212 itself, and reflects the measurement result to the PCR of the TPM module 1212 (S2120). The TPM module 1212 reads the execution file from the save destination of the execution file provided as the arguments, and loads the execution file to the load destination (S2121). The TPM module 1212 performs the measurement of the RTOS 1220, using the TPM module 1212 itself, and checks whether the RTOS 1220 has been tampered with (S2122). If the RTOS 1220 has been tampered with, the TPM module 1212 stops the processing, and notifies the virtual machine monitor 1240 about the execution failure, via the TPM OS 1222 (S2123). If not, the TPM module 1212 reflects the measurement result to the PCR of the TPM module 1212, and executes the RTOS 1220 (S2124). The RTOS 1220 performs the measurement of the communication application 1214 with use of the TPM module 1212, and checks whether the communication application 1214 has been tampered with (S2125). If the communication application 1214 has been tampered with, the RTOS 1220 stops the processing, and notifies the RTOS 1220 about the execution failure (S2126). If not, the RTOS 1220 reflects the measurement result to the PCR of the TPM module 1212, and executes the communication application 1214 (S2127).

With these operations, it is possible to use the communication services provided by the communication carrier using applications such as the RTOS 1220 and the communication application 1214, after confirming that the TPM for the communication carrier has not been tampered with.

Next, operations performed by the copyrights management company to ensure the security of applications such as the DRM application 1210. To start up, the DRM application 1210 uses the TPM module 1213 for the copyrights management company, which is different from the TPM 1256 and the TPM module 1212, as described above.

To ensure the security, the RTOS 1220 requests the TPM module 1212 to execute the TPM module 1213 (S2128). Here, since it has been already confirmed that the TPM module 1212 has not been tampered with, it is possible to execute the TPM module 1213 and to check whether the TPM module 1213 has been tampered with, under a secure environment. When making the request, the RTOS 1220 notifies the TPM module 1212 about the save destination and the load destination of the execution file of the DRM application 1210. The TPM module 1212 performs the measurement of the TPM module 1213, which is stored at a location indicated by the setting file that the TPM module 1212 reads when started up, and checks whether the TPM module 1213 has been tampered with (S2129). If the TPM module 1213 has been tampered with, the TPM module 1212 stops the processing, and notifies the RTOS 1220 about the execution failure (S2130). If not, the TPM module 1212 reflects the measurement result to the PCR of the TPM module 1213, and executes the TPM module 1213 with use of arguments, which are the save destination and the load destination of the execution file of the DRM application 1210 notified by the RTOS 1220 (S2131). The TPM module 1213 performs the measurement of the TPM module 1213 itself, and reflects the measurement result to the PCR of the TPM module 1213 (S2132). The TPM module 1213 reads the execution file from the save destination of the execution file provided as the arguments, and loads the execution file to the load destination (S2133). The TPM module 1213 performs the measurement of the DRM application 1210 and checks whether the DRM application 1210 has been tampered with (S2134). If the DRM application 1210 has been tampered with, the TPM module 1213 stops the processing, and notifies the RTOS 1220 about the execution failure (S2135). If not, the TPM module 1213 reflects the measurement result to the PCR of the TPM module 1213, and executes the DRM application 1210 (S2136).

With these operations, it is possible to use the rights purchasing service provided by the copyrights management company using applications such as the DRM application 1210 after confirming that the TPM for the copyrights management company has not been tampered with.

3.4 Method for Judging the Recovery from the Power-Saving State

Next, the following explains the judgment on whether to recover the virtual machine 1232 in the power-saving state.

If the processing event information 1420 occurs while the virtual machine 1232 is in the power-saving state, the resuming judgment unit 1244 performs judgment on whether to recover the virtual machine 1232 from the power-saving state to output the processing event information 1420 to the virtual machine 1232.

The resuming judgment unit 1244 performs the judgment based on the processing identifier 1423 included in the processing event information 1420. Firstly, when the system is started up, the resuming judgment unit 1244 reads notification timing management information 1430 from the setting file. The notification timing management information shows, for each processing identifier 1423, whether to recover the virtual machine from the power-saving state and output the processing event information 1420 to the virtual machine.

FIG. 26 shows the data structure of the notification timing management information 1430. The notification timing management information 1430 includes two types of notification timing information. One shows that it is necessary to immediately notify the virtual machine, and the other shows that it is only necessary to notify the virtual machine when it recovers from the power-saving state. One of these two types of information is described for each processing identifier 1423. The following shows the recovery judgment method corresponding to each type of the notification timing information.

Examples of the processing event information 1420 whose notification timing information shows that it is necessary to immediately notify the virtual machine about the processing event are those of an event where the virtual machine monitor 1240 requests the TPM-OS 1222 to execute the RTOS 122 and an event of a request for calculating the hash value of the program that is being executed. These events are for ensuring the security of the mobile terminal 1200, and they are important in terms of the security. Therefore, on receipt of the notification, it is necessary to perform the processing as soon as possible, to prevent unauthorized acts. In this embodiment, the notification timing of such important events is determined as requiring an immediate notification. In this case, the resuming judgment unit 1244 judges to recover the notification target virtual machine 1232 from the power-saving state to the normal state based on the processing identifier 1423 of the processing event and the setting file.

Examples of the processing event information 1420 whose notification timing information shows that it is only necessary to notify the virtual machine when it recovers from the power-saving state are those of events where the application uses the functions of the TPM, such as an event where the DRM application 1210 decrypts rights information or the like with use of the encryption/decryption function of the TPM module 1213. In this case, the resuming judgment unit 1244 judges not to recover the notification target virtual machine 1232 from the power-saving state to the normal state, based on the processing identifier 1423 and the setting file. In the same manner as in the first embodiment, the virtual machine 1232 is notified of the event when it recovers from the power-saving state due to other factors.

In the second embodiment, the processing event information 1420 identified by the processing identifier 1423 is used for classifying the notification timings, according to the security level in the mobile terminal 1200. Specifically, the timings are classified into two cases, namely one is the case where the immediate notification is required, and the other is the case where the notification after the recovery from the power-saving state is required. The present invention is not limited to this. For example, the software programs used in the mobile terminal 1200 may be classified into three groups, namely one is a group of programs that are measured by the TPM 1256, another is a group of programs that are measured by the TPM module 1212, and the other is a group of programs that are measured by the TPM module 1213. The notification from the group of programs that are measured by the TPM module 1212 to the group of programs that are measured by the TPM module 1213 may be the immediate notification, and the notification in the reverse direction may be the notification after the recovery from the power-saving state. In this case, the notification timings are classified based on the notification direction between the software programs including the TPM 1256, the TPM module 1212 and the TPM module 1213.

4. Other Modification Examples

The present invention is described above based on the embodiments. However, the present invention is not limited to the embodiments. The following cases are included in the present invention.

(1) In the first and second embodiments, the mobile terminal is taken as an example. However, the present invention is not limited to this. The present invention may be applied to other data processing apparatuses such as a TV, a personal computer and an optical disc player.

(2) In the first embodiment, the application software designates the notification timing, and, in the second embodiment, the notification timing is designated for each processing event. However, the present invention is not limited to this. For example, the other one of these designation methods may be used in each of the embodiments. Also, the notification timing may be designated by the user via the I/O device.

(3) In the first embodiment, two applications share the rights information of the content, and when the rights information is updated, the update is notified only immediately before the expiration of the playback rights indicated by the un-updated rights information. However, the present invention is not limited to this. It is only required that the two applications share the data required for continuing the playback of the content or the like, one of the applications judges whether to continue the processing with reference to the data, and the other application changes the data. For example, if a content includes a part that can be viewed at fast speed and a part that can not, two applications included in a device having a function for the fast forwarding may share information used for the judgment on whether the fast forwarding can be performed continuously. In this regard, one of the two applications may be an application for controlling the fast forwarding of the content, and the other may be an application for reading the information used for the judgment and changing the shared data. Also, in the case of a device that performs scheduled recording of TV programs, if it is possible to acquire the broadcast times of TV programs via a network, a broadcasting time acquiring application, which is for acquiring the broadcast times, may not notify a scheduled recording application, which is for recording a TV program at a scheduled time, of the change to the broadcast time until immediately before the scheduled time. It is also applicable to an application that regularly acquires information such as news from WWW sites on a network and displays the acquired information. If this is the case, an address registration application and an information display application may share the addresses of the WWW sites. In this case, even if the address registration application changes the address of a WWW site, the address registration application may not notify the information display application about the change until immediately before the information display application acquires the address of the www site. With this structure, it is possible to make the event notification that takes the power saving into consideration before the virtual machine, on which the scheduled recording application and the information display application are running, enters into the power-saving state.

(4) Each of the apparatuses described above is, specifically, a computer system that is structure from a microprocessor, a ROM, a RAM, a hard disk unit, a display unit, a keyboard, a mouse, and so on. A computer program is stored in the RAM and the hard disk unit. Each apparatus achieves predetermined functions by the microprocessor operating according to the computer programs. The computer program is composed of a plurality of instruction codes showing instructions with respect to a computer in order to have predetermined functions achieved.

(5) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program. Note that each apparatuses is not limited to a computer system that includes all of the microprocessor, the ROM, the RAM, the hard disk unit, the display unit, the keyboard, the mouse, and so on. The computer system may include only some of these components.

The units that are the compositional elements of each of the apparatuses may be realized separately with individual chips, or part or all may be included on one chip.

Here, the LSI may be variously called as an IC, a system LSI, a super LSI, or ultra LSI, depending on the degree of integration. The technique used to make an integrated circuit for the encryption device 200 does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, or the like is considered to be a possibility.

(6) Part or all of the compositional elements of each apparatus may be composed of a removable IC card or a single module. The IC card or the module is a computer system composed of a microprocessor, a ROM, a RAM, or the like. The IC card or the module may be included the aforementioned super-multifunctional LSI. The IC card or the module achieves its functions by the microprocessor operating according to computer program. The IC card or the module may be tamper resistant.

(7) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(8) Another aspect of the present invention is a data processing apparatus that manages a plurality of virtual machines, each of the virtual machines having a function to switch between a normal state and a power-saving state and having been configured to cause an interruption for returning to the normal state before entering into the power-saving state, the data processing apparatus comprising: a virtual machine management unit operable to mange the virtual machines; an inter-VM notification management unit operable to manage an event that is to be notified to one or more of the virtual machines; a shared-data management unit operable to manage shared data shared among two or more of the virtual machines; an interruption period length acquisition unit operable to acquire a length of a period until the interruption for returning to the normal state is caused; a resuming judgment unit operable to judge whether to cause each of the virtual machines to return to the normal state according to notification timing information that shows a timing of notifying the event for each of the virtual machines; and a waiting event storage unit operable to store the event if the resuming judgment unit judges not to notify the event to any of the virtual machines.

(9) In the modification example (8) above, the notification timing information indicates, for each of the virtual machines, that the event should be notified even if the corresponding virtual machine is in the power-saving state, or the event should be notified within a predetermined period, or the event should be notified when the virtual machine returns to the normal state from the power-saving state, and if the notification timing information indicates that the event should be notified within a predetermined period, the resuming judgment unit acquires the length of the period until the interruption from the interruption period length acquisition unit and judges whether to cause the corresponding virtual machine to return to the normal state according to the length of the period until the interruption.

(10) In the modification example (8) or (9), if the period until the interruption is longer than a period required for the corresponding virtual machine to return to the normal state, the resuming judgment unit may cause the event storage unit to store the event to be notified to the corresponding virtual machine, and judge not to cause the corresponding virtual machine to return to the normal state from the power-saving state.

(11) In any of the modification examples (8) to (10), if the period until the interruption is shorter than the period required for the corresponding virtual machine, the resuming judgment unit may judge to cause the corresponding virtual machine to return to the normal state from the power-saving state.

(12) In any of the modification examples (8) to (11), if the notification timing information indicates that the event should be notified even if the corresponding virtual machine is in the power-saving state, the resuming judgment unit may judge to cause the corresponding virtual machine to return to the normal state from the power-saving state.

(13) In any of the modification examples (8) to (12), if the notification timing information indicates that the event should be notified when the virtual machine returns to the normal state from the power-saving state, the resuming judgment unit may judge not to cause the corresponding virtual machine to return to the normal state from the power-saving state.

(14) The data processing apparatus of the modification examples (8) to (13) may have a plurality of programs each running on the any of the virtual machines, wherein each of the virtual machine has a virtual machine identifier, the programs use the shared data that is provided in a plurality of pieces and managed by the shared-data management unit, each of the programs has a program identifier, the shared-data management unit has management information for managing each piece of the shared data, and the management information includes the program identifier of a program that uses a corresponding piece of the shared data, the virtual machine identifier of the virtual machine on which the program runs and the notification timing information.

(15) In the data processing apparatus of the modification examples (8) to (14) may further comprise a timer that causes an interruption at a predetermined time, wherein each of the virtual machines sets a time at which the interruption is to be caused as the interruption for returning to the normal state, and the interruption period length acquisition unit acquires the length of the period until the interruption for returning to the normal state is caused from the timer.

(16) Another aspect of the present invention is a rights distribution system that includes the data processing apparatus of the modification example (8), a rights management server and a storage apparatus, the storage apparatus storing therein content information that has been encrypted, the rights management server transmitting to the data processing apparatus rights information relating to rights to use of the content information on reception of a request, the data processing apparatus being equipped with the virtual machines, a first program that runs on a first virtual machine included in the virtual machines, and a second program that runs on a second virtual machine included in the virtual machines, wherein the first program receives the rights information from the rights management server, the second program decrypts the content information using a decryption key included in the rights information, and the first program and the second program share the rights information as the shared data.

(17) Another aspect of the present invention is a virtual machine monitor used in a data processing apparatus that manages a plurality of virtual machines, each of the virtual machines having a function to switch between a normal state and a power-saving state and having been configured to cause an interruption for returning to the normal state before entering into the power-saving state, the virtual machine monitor comprising: a virtual machine management unit operable to mange the virtual machines; an inter-VM notification management unit operable to manage an event that is to be notified to one or more of the virtual machines; a shared-data management unit operable to manage shared data shared among two or more of the virtual machines; an interruption period length acquisition unit operable to acquire a length of a period until the interruption for returning to the normal state is caused; a resuming judgment unit operable to judge whether to cause each of the virtual machines to return to the normal state according to notification timing information that shows a timing of notifying the event for each of the virtual machines; and a waiting event storage unit operable to store the event if the resuming judgment unit judges not to notify the event to any of the virtual machines.

(18) Another aspect of the present invention is a data processing method for managing a plurality of virtual machines, each of the virtual machines having a function to switch between a normal state and a power-saving state and having been configured to cause an interruption for returning to the normal state before entering into the power-saving state, the data processing method comprising: a virtual machine management step of managing the virtual machines; an inter-VM notification management step of managing an event that is to be notified to one or more of the virtual machines; a shared-data management step of managing shared data shared among two or more of the virtual machines; an interruption period length acquiring step of acquiring a length of a period until the interruption for returning to the normal state is caused; a resuming judgment step of judging whether to cause each of the virtual machines to return to the normal state according to notification timing information that shows a timing of notifying the event for each of the virtual machines; and a waiting event storage step of storing the event if the resuming judgment step judges not to notify the event to any of the virtual machines.

(19) Another aspect of the present invention is a data processing program for managing a plurality of virtual machines, each of the virtual machines having a function to switch between a normal state and a power-saving state and having been configured to cause an interruption for returning to the normal state before entering into the power-saving state, the data processing program comprising: a virtual machine management step of managing the virtual machines; an inter-VM notification management step of managing an event that is to be notified to one or more of the virtual machines; a shared-data management step of managing shared data shared among two or more of the virtual machines; an interruption period length acquiring step of acquiring a length of a period until the interruption for returning to the normal state is caused; a resuming judgment step of judging whether to cause each of the virtual machines to return to the normal state according to notification timing information that shows a timing of notifying the event for each of the virtual machines; and a waiting event storage step of storing the event if the resuming judgment step judges not to notify the event to any of the virtual machines.

(20) Another aspect of the present invention is a recording medium having recorded thereon a data processing program for managing a plurality of virtual machines, each of the virtual machines having a function to switch between a normal state and a power-saving state and having been configured to cause an interruption for returning to the normal state before entering into the power-saving state, the data processing program comprising: a virtual machine management step of managing the virtual machines; an inter-VM notification management step of managing an event that is to be notified to one or more of the virtual machines; a shared-data management step of managing shared data shared among two or more of the virtual machines; an interruption period length acquiring step of acquiring a length of a period until the interruption for returning to the normal state is caused; a resuming judgment step of judging whether to cause each of the virtual machines to return to the normal state according to notification timing information that shows a timing of notifying the event for each of the virtual machines; and a waiting event storage step of storing the event if the resuming judgment step judges not to notify the event to any of the virtual machines.

(21) Another aspect of the present invention is an integrated circuit used in a data processing apparatus that manages a plurality of virtual machines, each of the virtual machines having a function to switch between a normal state and a power-saving state and having been configured to cause an interruption for returning to the normal state before entering into the power-saving state, the integrated circuit comprising: a virtual machine management unit operable to mange the virtual machines; an inter-VM notification management unit operable to manage an event that is to be notified to one or more of the virtual machines; a shared-data management unit operable to manage shared data shared among two or more of the virtual machines; an interruption period length acquisition unit operable to acquire a length of a period until the interruption for returning to the normal state is caused; a resuming judgment unit operable to judge whether to cause each of the virtual machines to return to the normal state according to notification timing information that shows a timing of notifying the event for each of the virtual machines; and a waiting event storage unit operable to store the event if the resuming judgment unit judges not to notify the event to any of the virtual machines.

(22) Any of the embodiments and the modification examples may be combined together.

INDUSTRIAL APPLICABILITY

The present invention may be used managerially, continuously, and repeatedly, in any industry that manufactures or sells electrical devices that includes a plurality of virtual machines, any of which enters into the power-saving mode, and in any industry that provides various services with use of such electrical devices.

The invention claimed is:
1. A data processing apparatus comprising:
a playback unit operable to play back a content;
a first virtual execution unit operable to switch an operation mode thereof between a normal state and a power-saving state, and to judge whether to permit continuation of playback of the content based on a duration of the playback determined by given information;
a second virtual execution unit operable to make a change to the given information; and
a virtual machine monitor including a memory storing the given information and operable to manage the first virtual execution unit and the second virtual execution unit,
wherein, before entering into the power-saving state, the first virtual execution unit notifies the virtual machine monitor of a time to return to the normal state from the power-saving state, and stays in the power-saving state until the time to return, the time to return being earlier than an end of the duration of the playback determined by the given information, and
wherein, if the given information has been changed, then the virtual machine monitor notifies, at the time to return, the first virtual execution unit that the given information has been changed.

2. The data processing apparatus of claim 1, wherein the first virtual execution unit returns to the normal state when notified by the virtual machine monitor that the given information has been changed, and the first virtual execution unit judges whether to permit the continuation of the playback based on the given information.

3. The data processing apparatus of claim 2, wherein, if the virtual machine monitor judges that the given information will not be changed until the time to return, then the virtual machine monitor notifies the first virtual execution unit that the given information will not be changed, and causes the first virtual execution unit to return to the normal state.

4. The data processing apparatus of claim 3,
wherein the virtual machine monitor stores therein a first timing and a second timing,
wherein the first timing is a timing of (i) causing the first virtual execution unit to return to the normal state in a case where the given information has not been changed, and (ii) notifying the first virtual execution unit that the given information has not been changed,
wherein the second timing is a timing of (i) causing the first virtual execution unit to return to the normal state in a case where the given information has been changed, and (ii) notifying the first virtual execution unit that the given information has been changed, and
wherein the first timing is earlier than the second timing, and the second timing is earlier than the time to return.

5. The data processing apparatus of claim 4, wherein, if the second virtual execution unit has made any change to the given information at a time between the first timing and the second timing, then the virtual machine monitor immediately causes the first virtual execution unit to return to the normal state.

6. The data processing apparatus of claim 1,
wherein, to make a change to the given information, the second virtual execution unit requests the virtual machine monitor to make the change to the given information stored in the memory, and
wherein the virtual machine monitor makes the change to the given information based on the request from the second virtual execution unit.

7. The data processing apparatus of claim 1, wherein the given information is copyright management information that relates to rights to use the content.

8. The data processing apparatus of claim 1, wherein the given information is another content that follows the content.

9. The data processing apparatus of claim 1,
wherein the playback unit has a function to fast-forward the content, and
wherein, in the normal state, the first virtual execution unit judges whether to permit continuation of fast forwarding of the content based on the given information.

10. The data processing apparatus of claim 1,
wherein the virtual machine monitor includes a timer, and
wherein, if the second virtual execution unit has made any change to the given information, then the virtual machine monitor acquires a length of a period until the time to return based on the timer, and notifies the first virtual execution unit that the second virtual execution unit has made any change to the given information based on the acquired length of the period.

11. A non-transitory computer-readable recording medium having a processing program recorded thereon the data processing program causing a computer execute a method comprising:
first processing of playing back a content;
second processing of switching an operation mode between a normal state and a power-saving state, and judging whether to permit continuation of playback of the content based on a duration of the playback determined by given information;
third processing of making a change to the given information; and
fourth processing of managing a memory to store the given information and managing the second processing and the third processing,
wherein, in the second processing, before switching to the power-saving state, a time to return to the normal state from the power-saving state is determined, and the power-saving state is kept until the time to return, the time to return being earlier than an end of the duration of the playback determined by the given information, and
wherein, in the fourth processing, if any change has been made to the given information, then the computer updates the given information stored in the memory, and reflects, at the time to return, the change to the second processing.

12. An integrated circuit comprising an information processing unit and a storage unit that stores a data processing program, the data processing program causing the information processing unit to perform:
first processing of playing back a content;
second processing of switching an operation mode between a normal state and a power-saving state, and judging whether to permit continuation of playback of the content based on a duration of the playback determined by given information;
third processing of making a change to the given information; and
fourth processing of managing a memory to store the given information and managing the second processing and the third processing,
wherein, in the second processing, before switching to the power-saving state, the information processing unit determines a time to return to the normal state from the power-saving state, and stays in the power-saving state until the time to return, the time to return being earlier than an end of the duration of the playback determined by the given information, and
wherein, in the fourth processing, if any change has been made to the given information, then the information processing unit updates the given information stored in the memory, and reflects, at the time to return, the change to the second processing.

\* \* \* \* \*